US007483159B2

(12) United States Patent
Tokutomo et al.

(10) Patent No.: US 7,483,159 B2
(45) Date of Patent: Jan. 27, 2009

(54) PRINT APPARATUS CONSUMABLE PURCHASE SYSTEM AND PROGRAM USED WITH THE SYSTEM

(75) Inventors: Fumio Tokutomo, Nagano (JP); Masumi Yoshino, Nagano (JP); Eiko Yanagida, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 789 days.

(21) Appl. No.: 09/925,737

(22) Filed: Aug. 10, 2001

(65) Prior Publication Data

US 2002/0054340 A1 May 9, 2002

(30) Foreign Application Priority Data

Aug. 10, 2000 (JP) .......................... P.2000-242737
Jul. 2, 2001 (JP) .......................... P.2001-201022

(51) Int. Cl.
*G06F 3/12* (2006.01)
*G06K 15/00* (2006.01)

(52) U.S. Cl. .................... 358/1.15; 358/1.13; 358/1.14; 399/24

(58) Field of Classification Search ................ 358/1.13, 358/1.15, 1.1, 1.9, 1.14, 1.16, 1.17, 1.18, 358/1.11, 1.2, 1.3, 1.4, 1.5, 1.6, 1.7, 1.8, 358/406, 407, 437, 468, 500, 501, 504; 399/9, 399/11, 27, 1, 8, 24, 25, 28, 29, 30, 12; 347/2, 347/3, 5, 14, 23; 715/700, 736, 808; 705/26, 705/27; 709/224
See application file for complete search history.

(56) References Cited

U.S. PATENT DOCUMENTS 6,113,208 A * 9/2000 Benjamin et al. .............. 347/7
6,233,408 B1 5/2001 Allen
6,798,997 B1 * 9/2004 Hayward et al. .............. 399/12
7,054,832 B1 * 5/2006 Vallabh ....................... 705/26

FOREIGN PATENT DOCUMENTS

EP 0 685 768 12/1995
EP 0 832 749 4/1998
EP 0 878 305 11/1998
JP 2891090 8/1995
JP 7-322032 12/1995
JP 8-187921 7/1996
JP 10-301451 11/1998

* cited by examiner

*Primary Examiner*—Dov Popovici
(74) *Attorney, Agent, or Firm*—Oblon, Spivak, McClelland, Maier & Neustadt, P.C.

(57) ABSTRACT

A consumable purchase assist program is built in a computer (500) to which a print apparatus (400) is connected, and contains at least a purchase source information acquisition step for acquiring via a network (220), purchase source information containing dealer information of a consumable required for the print apparatus to print or selling condition information, a type information acquisition step for acquiring consumable type information from the print apparatus, and a consumable information display step for displaying the contents of the purchase source information and the type information on a screen of the computer.

23 Claims, 19 Drawing Sheets

PRINT APPARATUS CONSUMABLE PURCHASE SYSTEM AND PROGRAM USED WITH THE SYSTEM

BACKGROUND OF THE INVENTION

This invention relates to a print apparatus consumable purchase system and a program used with the system.

Generally, in a print apparatus such as a printer, a copier, or a facsimile, normally, when the coloring material remaining amount of a coloring material cartridge such as an ink cartridge, an ink-sublimation film cartridge, a toner cartridge, or an ink ribbon cartridge becomes low or zero, a warning indicating the fact is displayed on the display section of the print apparatus or the display of the computer connected to the print apparatus.

A print apparatus in the related art print apparatuss, on a print paper, a warning containing the model of the ink cartridge (coloring material cartridge) as disclosed in Japanese Patent No. 2891090. Further, when the fact that the ink remaining amount of the ink cartridge (coloring material cartridge) in a facsimile machine becomes low is detected, the facsimile machine automatically dialed a phone number of a trader stored in a number storage device in the facsimile machine to order the ink cartridge.

According to the above-described art in Japanese Patent No. 2891090, when the ink remaining amount of the ink cartridge becomes low, the printer outputs a warning paper on which the model of the ink cartridge is printed, thus the user can save labor such as looking up the model of the ink cartridge and making a memo of the model. However, the art involves the following problems:

Since the ink getting low is used to print the warning, essentially necessary ink in the ink cartridge decreases still more and print paper is consumed fruitlessly. If the warning is printed when normal print is started or during printing, the throughput of the essential print operation is degraded. In addition, the warning gets mixed with the normal printed document and the user may not notice that the warning is printed.

On the other hand, according to the above-described art in JP-A-7-322032, the problems involved in Japanese Patent No. 2891090 such that ink getting low in the ink cartridge decreases still more and that print paper is consumed fruitlessly do not arise, however, the art involves the following problem:

When the ink remaining amount becoming low is detected, the number of the predetermined trader to be given an order for a new ink cartridge is automatically dialed. Thus, if the user already keeps an ink cartridge in stock, an order is automatically given for a new ink cartridge and this situation is against a user's will.

SUMMARY OF THE INVENTION

It is therefore an object of the invention to provide a print apparatus consumable purchase system for enabling the user to check a print apparatus consumable for consumption degree before conducting a formality of purchasing the consumable and a program used with the system.

To the end, according to a first aspect of the invention, there is provided print apparatus consumable purchase system comprising:

print apparatus for printing on a print medium;

display means capable of displaying information concerning the print apparatus; and control means for displaying a status screen for representing consumption degree of a consumable used with the print apparatus on the display means and displaying at least a delivery purchase button for making a request for delivery purchase of the consumable in the status screen.

In the print apparatus consumable purchase system, the status screen for representing the consumption degree of the consumable used with the print apparatus is displayed on the display means and at least the delivery purchase button for making a request for delivery purchase of the consumable is displayed in the status screen. The "delivery purchase" means that the purchased consumable is to be delivered. According to the system, when the user determines purchasing the consumable after checking the consumable for consumption degree in the status screen, if the user simply presses the delivery purchase button on the status screen, he or she can receive service of delivering the purchased consumable; this point is convenient for the user.

The "print apparatus" includes not only a normal printer, but also a general unit for printing on a print medium, such as a facsimile or a copier. As the "consumable used with the print apparatus," a coloring material cartridge (ink cartridge, toner cartridge, ink-sublimation cartridge, or ink ribbon cartridge), print paper set in a cassette, a rubber roller for paper feed, etc., can be named. When the cassette becomes empty of print paper, it is replaced with a paper-filled cassette or is replenished with print paper. The "consumption degree of consumable" is the ink remaining amount if the consumable is an ink cartridge of a coloring material cartridge, the toner remaining amount when the consumable is a toner cartridge, the film remaining amount or the ink concentration when the consumable is an ink-sublimation cartridge, or the ink ribbon remaining amount or the ink concentration when the consumable is an ink ribbon cartridge.

According to a second aspect of the invention, there is provided a print apparatus consumable purchase system comprising:

a print apparatus for printing on a print medium;

display means capable of displaying information concerning the print apparatus; and control means for displaying a status screen for representing consumption degree of a consumable used with the print apparatus on the display means and displaying at least a store purchase button for calling dealer information concerning a dealer dealing in the consumable in the status screen.

In the print apparatus consumable purchase system, the status screen for representing the consumption degree of the consumable used with the print apparatus is displayed on the display means and at least the store purchase button for calling dealer information is displayed in the status screen. The "store purchase" means purchasing the consumable at a store. According to the system, when the user determines purchasing the consumable after checking the consumable for consumption degree in the status screen, if the user simply presses the store purchase button on the status screen, he or she can get the dealer information useful for store purchase and determine which store the consumable is to be purchased at based on the information; this point is convenient for the user.

According to a third aspect of the invention, there is provided a print apparatus consumable purchase system comprising:

a print apparatus for printing on a print medium;

display means capable of displaying information concerning the print apparatus; and control means for displaying a status screen for representing consumption degree of a consumable used with the print apparatus on the display means and displaying one of a plurality of options concerning the purchase mode of the consumable in the status screen and an option calling button for calling the plurality of options in the status screen.

In the print apparatus consumable purchase system, the status screen for representing the consumption degree of the consumable used with the print apparatus is displayed on the display means and a plurality of options concerning the purchase mode of the consumable are displayed in the status screen or the option calling button for calling the plurality of options is displayed in the status screen. Thus, in the former, the user can select the purchase mode meeting his or her will from among the plurality of options displayed in the status screen for purchasing the consumable; in the latter, the user can turn on the option calling button displayed in the status screen for displaying a plurality of options on the display means and then can select the purchase mode meeting his or her will from among the plurality of options for purchasing the consumable. The user may determine whether or not the consumable is to be purchased after checking the consumable for consumption degree in the status screen; this point is convenient for the user. The option calling button may be a button for immediately calling a plurality of options or may be a button for calling a plurality of options via some information source or information site.

According to a fourth aspect of the invention, there is provided a print apparatus consumable purchase system comprising:

a print apparatus for printing on a print medium;

display means capable of displaying information concerning the print apparatus; and control means for determining, based on remaining amount of a consumable used with the print apparatus, whether replacement of the consumable is necessary, wherein if it is determined that the replacement is necessary, the control means displays one of a plurality of options concerning the purchase mode of the consumable on the display means and an option calling button for calling the plurality of options on the display means.

In the print apparatus consumable purchase system, if it is determined based on the remaining amount of the consumable that it is necessary to replace the consumable, a plurality of options concerning the purchase mode of the consumable are displayed on the display means or the option calling button for calling the plurality of options is displayed on the display means. Thus, in the former, the user can select the purchase mode meeting his or her will from among the plurality of options displayed on the display means for purchasing the consumable; in the latter, the user can turn on the option calling button displayed on the display means for displaying a plurality of options on the display means and then can select the purchase mode meeting his or her will from among the plurality of options for purchasing the consumable. When the consumable needs to be replaced, automatically the plurality of options or the option calling button is displayed. Thus, the user can check the consumable for consumption degree based on the display and may determine whether or not the consumable is to be purchased after the checking; this point is convenient for the user.

The remaining amount of the consumable may be found in any manner; for example, if the consumable is ink, the number of ejected ink dots may be counted for calculating the ink consumption amount and subtracting the ink consumption amount from the original ink amount to find the remaining amount of the consumable.

The control means may determine whether or not it is necessary to replace the consumable based on the remaining amount of the consumable and if the control means determines that it is necessary to replace the consumable, the control means may display a status screen for representing the consumption degree of the consumable on the display means and display a plurality of options concerning the purchase mode of the consumable in a status screen or display an option calling button for calling the plurality of options in the status screen. In doing so, the user can see the consumption degree of the consumable on the status screen and check the necessity for replacing the consumable before selecting the purchase mode meeting his or her will for purchasing the consumable.

In the print apparatus consumable purchase system in the third or fourth aspect of the invention, the control means may determine that it is necessary to replace the consumable when the remaining amount of the consumable becomes equal to or less than or becomes less than a predetermined threshold value. In doing so, when the remaining amount of the consumable becomes low, it can be determined that the consumable needs to be replaced, and thus the replacement timing can be determined appropriately.

In the print apparatus consumable purchase system in the third or fourth aspect of the invention, when the option calling button is selected, the control means may connect to a predetermined server through a network and acquire a screen displaying the plurality of options from the server and display the screen on the display means. In doing so, for example, if a predetermined Web server makes a Web page enabling the user to select any one from among a plurality of purchase modes for the consumable, open to the public on the Internet, the system can be comparatively easily constructed by using the Web page.

In the print apparatus consumable purchase system in the third or fourth aspect of the invention, when the option calling button is selected, the control means may display the plurality of options on the display means and then if any option is selected from among the plurality of options, the control means may connect to a predetermined server through a network and acquire a screen corresponding to the selected option from the server and display the screen on the display means. In doing so, for example, if a Web page for selling the consumable in one purchase mode and a Web page for selling the same consumable in another purchase mode exist on the Internet, the system can be comparatively easily constructed by using the Web pages. If the option calling button is selected, the plurality of options may immediately be displayed on the display means, but may be displayed on the display means via some information source or information site. As the latter, when the system is once connected to one Web site and a country, a language, etc., is selected at the Web site, a plurality of options may be displayed in the selected language.

In the print apparatus consumable purchase system in the third or fourth aspect of the invention, the plurality of options concerning the purchase mode of the consumable may be a plurality of options including a delivery purchase button for making a request for delivery purchase of the consumable and a store purchase button for calling information concerning a dealer dealing in the consumable (dealer information). In doing so, the user can comparatively consider the merits and demerits of delivery purchase and store purchase and select the purchase mode meeting his or her will in response to the circumstances.

In the mode wherein the delivery purchase button is displayed, if the delivery purchase button is selected, the control means may acquire an ordering screen for ordering the consumable from a predetermined server through a network and display the screen on the display means. In doing so, the user can purchase the ink cartridge as on line shopping by performing easy operation.

In the mode wherein the ordering screen is displayed if the delivery purchase button is selected, if the delivery purchase button is selected, the control means may acquire a screen containing a selling condition input field for entering selling condition information or a selling condition disclosure field for disclosing selling condition information as the ordering screen from a predetermined server through a network and may display the screen on the display means. As the "selling condition," for example, the consumable model, price, tax, transportation charge, delivery destination, delivery method, etc., can be named. The "selling condition input field" is a field for the user to enter the selling condition to be presented; for example, delivery destination, delivery method, etc., can be named. The "selling condition disclosure field" is a field for the dealer to enter the selling condition to be presented; for example, in addition to the consumable model, price, tax, transportation charge, etc., in-stock or out-of-stock concerning the consumable, availability of empty vessel collection service, etc., can be named.

In the mode wherein the ordering screen is displayed if the delivery purchase button is selected, if the delivery purchase button is selected, the control means may acquire a screen containing a retrieval key information input field for entering user's place retrieval key information as the ordering screen from a predetermined server through a network and display the screen on the display means and transmit the user's place retrieval key information entered in the retrieval key information input field to the server, thereby receiving place-dependent selling condition information extracted by the server based on the user's place retrieval key information and displaying the received place-dependent selling condition information on the display means. The "user's place retrieval key information" refers to key information for finding out the user's place and is zip code, telephone area code, etc., for example. The "place-dependent selling condition information" is information concerning the selling condition changing depending on the place; for example, it is information concerning the tax if the tax varies from one place to another, information concerning the transportation charge if the transportation charge varies from one place to another, or the like. In doing so, the user can easily get the information concerning the selling condition changing depending on the place where the user resides.

In the mode wherein the store purchase button is displayed, if the store purchase button is selected, the control means may acquire a screen for providing the dealer information from a predetermined server through a network and display the screen on the display means. In doing so, the user can easily get the information concerning the selling agencies (stores) dealing in the consumable.

In the mode wherein the screen for providing the dealer information is displayed if the store purchase button is selected, the dealer information may contain at least either of address information and map information for locating a dealer place. In doing so, the user can select a dealer near to the place where the user resides from among the selling agencies dealing in the consumable, for example.

In the mode wherein the screen for providing the dealer information is displayed if the store purchase button is selected, if the store purchase button is selected, the control means may acquire a screen containing a retrieval key information input field for entering user's place retrieval key information as a screen for providing the dealer information from a predetermined server through a network and may display the screen on the display means and transmit the user's place retrieval key information entered in the retrieval key information input field to the server, thereby receiving place-dependent dealer information extracted by the server based on the user's place retrieval key information and displaying the received place-dependent dealer information on the display means. The "user's place retrieval key information" is information as described above. The "place-dependent dealer information" is information concerning the dealer information depending on the place; for example, the dealer information indicating the same dealer place as or the dealer place near to the place where the user lives in, etc., can be named. In doing so, the user can easily get the dealer information depending on the place where the user resides.

In the print apparatus consumable purchase system of the invention, preferably the consumable is a coloring material cartridge. The coloring material cartridge of the consumables used with the print apparatus is one of the most frequently used consumables and thus is suitable for the system.

In the print apparatus consumable purchase system of the invention, the print apparatus, the display means, and the control means may be implemented as separate components, but the print apparatus may contain the display means and the control means, some of various means may be contained in the print apparatus and others may be implemented as separate components from the print apparatus, or various means may be housed in one cabinet in appropriate combination.

A program for causing a computer to function as control means forming a part of the print apparatus consumable purchase system of the invention is normally recorded on a record medium such as CD-ROM or HDD that can be read by a CPU of the computer and is read from the record medium by the CPU for execution. Thus, such a program is used to make the most of the advantages of the print apparatus consumable purchase system described above and is high in usefulness.

The present disclosure relates to the subject matter contained in Japanese patent application No. 2000-242737 (filed on Aug. 10, 2000), and Japanese patent application No. 2001-201022 (filed on Jul. 2, 2001) which is expressly incorporated herein by reference in its entirety.

DETAILED DESCRIPTION OF PREFERRED EMBODIMENT

First Embodiment

Figure 1:
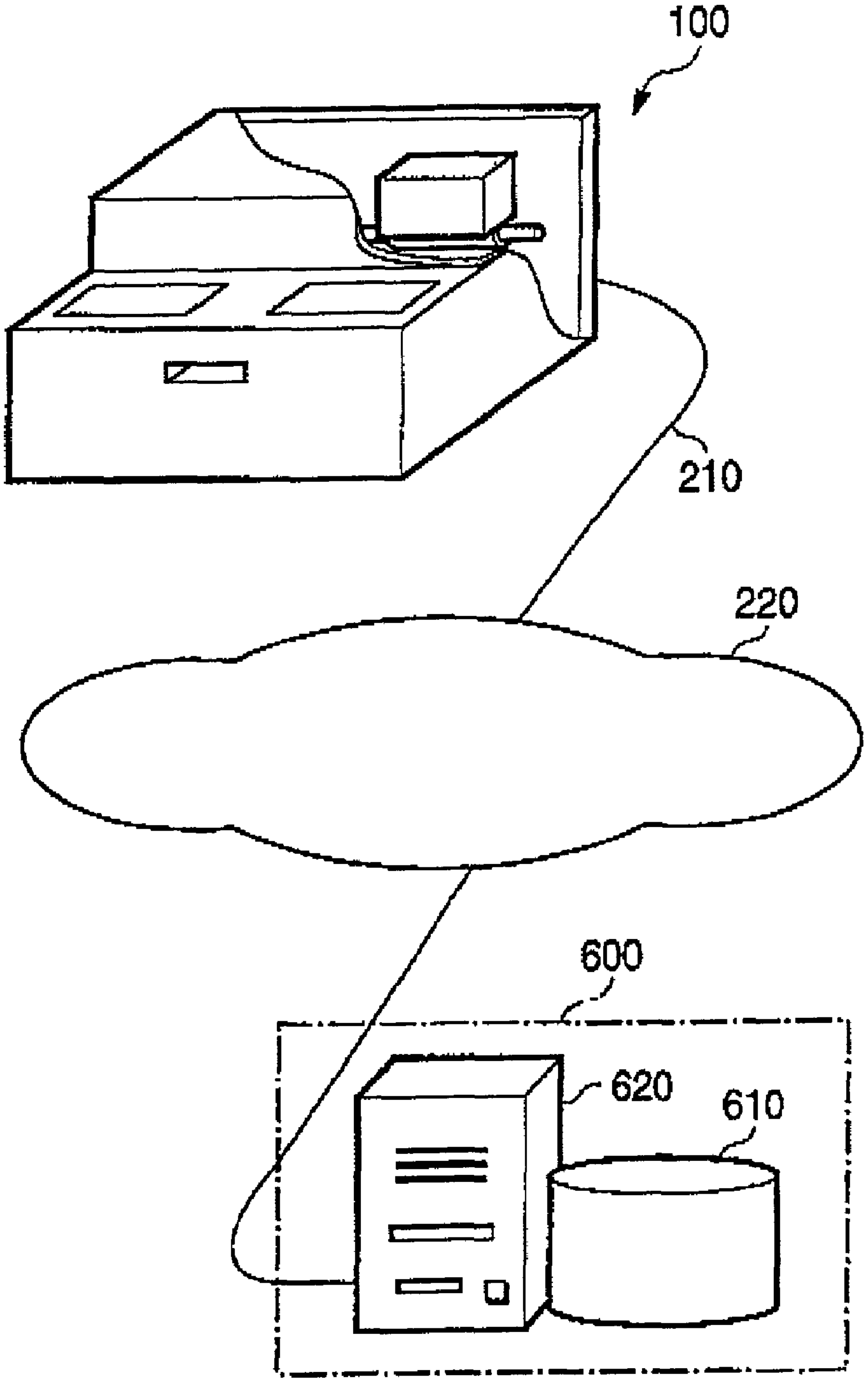
FIG. 1 is a drawing to describe a schematic configuration of a print apparatus in a first embodiment of the invention.
Figure 2:
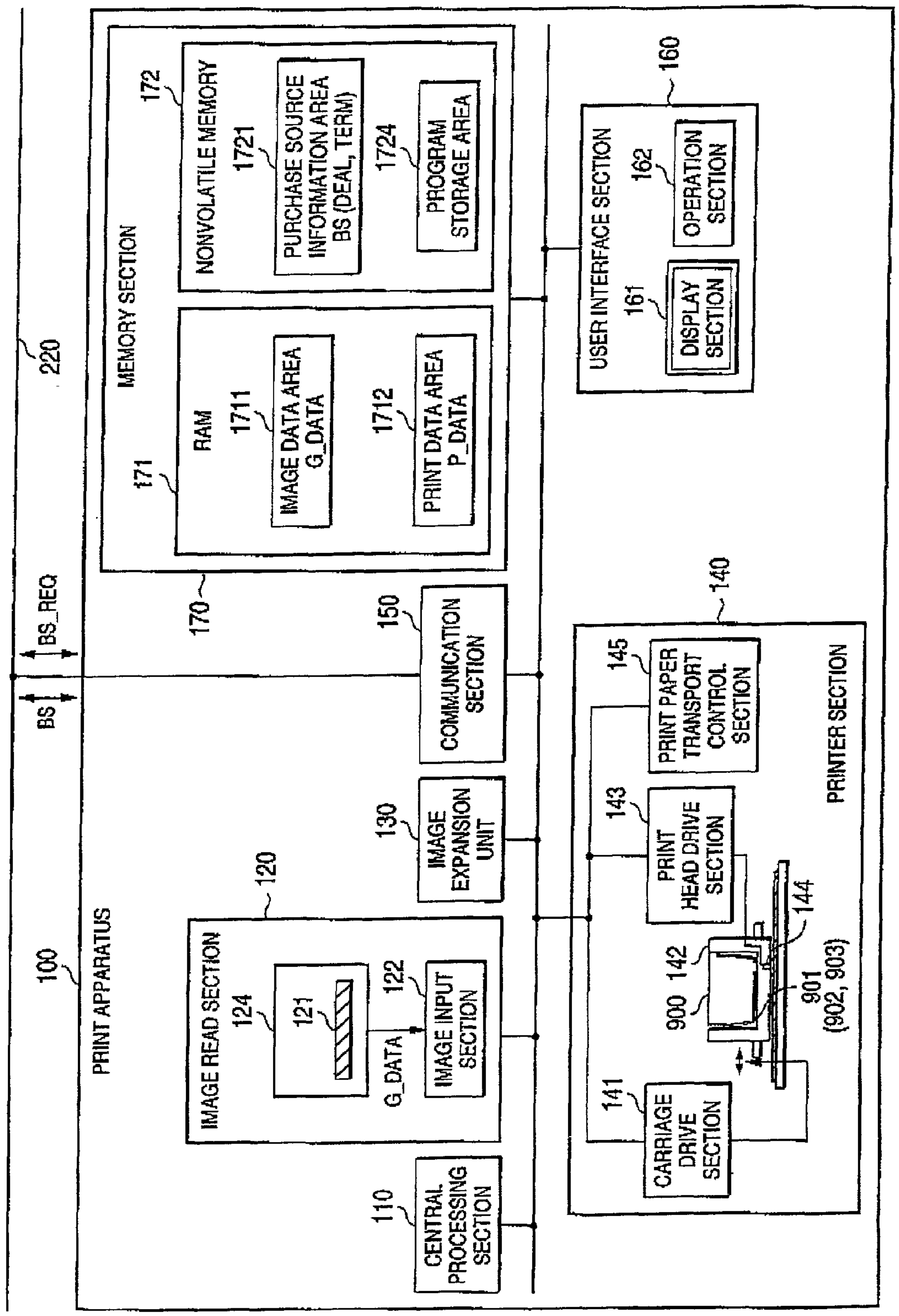
FIG. 2 is a detailed functional block diagram of the print apparatus in the first embodiment of the invention.

FIG. 1 is a drawing to describe a schematic configuration of a print apparatus in a first embodiment of the invention. FIG. 2 is a block diagram of the print apparatus. A print apparatus consumable purchase system in the embodiment is placed in one cabinet and is implemented as a print apparatus 100. The print apparatus 100 has a network function and can be connected to a network (Internet) 220 via a public line 210. A consumable dealer database site 600 is connected to the network 220. The consumable dealer database site 600 is shown as a Web server 620 comprising a storage unit 610 in FIG. 1, but substantially may be a so-called home page opened on the network.

The print apparatus 100 is a unit for printing an image captured by a digital camera, for example, and includes a central processing section 110, an image read section 120, image expansion unit 130, a printer section 140, a communication section 150, a user interface section 160, and a memory section 170.

The central processing section 110 is a compute unit containing a CPU and executes various programs recorded in the memory section 170.

The image read section 120 has a memory card slot 121 and an image input section 122 for inputting image data G_DATA through the memory card slot 121. A memory card 124 for a digital camera is inserted in the memory card slot 121. The image input section 122 reads the image data G_DATA in a format such as JPEG from the memory card 124 and stores the image data in an image data area 1711 in RAM 171 of the memory section 170.

The image expansion unit 130 converts the image data. G_DATA stored in the image data area 1711 into print data P_DATA in response to a user's print request and stores the print data in a print data area (print buffer) 1712 in the RAM 171.

The printer section 140 includes a carriage drive section 141, a print head drive section 143, and a print paper transport control section 145. A print head 144 is mounted on a carriage 142 and the carriage drive section 141 reciprocates the carriage along a platen not shown. The print head drive section 143 sends a drive signal to the print head 144 for printing an image corresponding to the print data P_DATA stored in the RAM 171 of the memory section 170 on print paper in cooperation with moving the carriage 142 by the carriage drive section 141 and transporting print paper by the print paper transport control section 145. An ink cartridge 900 is mounted on the carriage 142. The ink cartridge 900 is provided with IC memory 901 and an ink remaining amount information area 902 and a type information area 903 are allocated to the IC memory 901. Ink remaining amount information REST detected by the central processing section 110 is written into the ink remaining amount information area 902. If a cartridge having no IC memory is mounted, the ink remaining amount information REST can be written into nonvolatile memory 172 (described below). Purchase source information and/or type information of each cartridge and the address of the party from which the cartridge is gotten may be recorded in the IC memory 901. In this case, when the ink cartridge 900 is placed in the printer (is mounted on the carriage 142), the purchase source information, the type information, the address of the party from which the cartridge is gotten, etc., may be written into appropriate memory in the printer. In the embodiment, the purchase source information contains dealer information and at least either of selling condition information and purchase mode information. The ink remaining amount information REST with respect to the ink cartridge 900, detected by the central processing section 110, is written into the ink remaining amount information area 902, as described later. The type information ST of the ink cartridge 900, detected by the central processing section 110, is written into the type information area 903, as described later.

The communication section 150 can issue an acquisition request BS_REQ of purchase source information with respect to an ink cartridge to the dealer database site 600 (see FIG. 1) through the communication network 220 and can acquire the purchase source information BS from the dealer database site 600.

The user interface section 160 comprises a display section 161 and an operation section 162. The display section 161 comprises a liquid crystal display panel, LED indicators or the like, for displaying a low ink remaining amount warning, a no-paper warning, cleaning information, etc. The operation section 162 is made up of a touch panel, a keyboard and the like, and enables the user to switch the display mode and perform various reset operation.

The memory section 170 comprises the above-mentioned RAM 171 and nonvolatile memory 172. The image data area 1711 and the print data area 1712 are allocated in the RAM 171, as previously described. A purchase source information area 1721 and a program storage area 1724 are allocated in the nonvolatile memory 172. The purchase source information US (containing dealer information DEL and selling condition information TERM) is written into the purchase source information area 1721, as described above. Various programs read and executed by the CPU whenever necessary are stored in the program storage area 1724. Specifically, an ink remaining amount detection program, a cartridge type detection program, a cartridge ordering assist program, a cartridge replacement assist program, and a database site access program (containing the consumable information acquisition program) as well as a printer control program are written.

As for the ink remaining amount, the central processing section 110 updates the ink remaining amount information REST stored in the ink remaining amount information area 902 each time a predetermined amount of ink is consumed. The IC memory 901 is attached to the ink cartridge 900 as described above and the central processing section 110 can acquire the type information ST of the ink cartridge 900 for knowing the type, namely, the model of the ink cartridge 900.

Next, the operation of the print apparatus 100 of the embodiment will be discussed with reference to a flowchart of FIG. 3 and various display screen examples. Assume that print data P_DATA is stored in the image data area 1711 of the memory section 170. The image expansion unit 130 expands the image data G_DATA from the memory card 124 placed in the memory card slot 121 so that the print data P_DATA is prepared, as described above.

Figure 3:
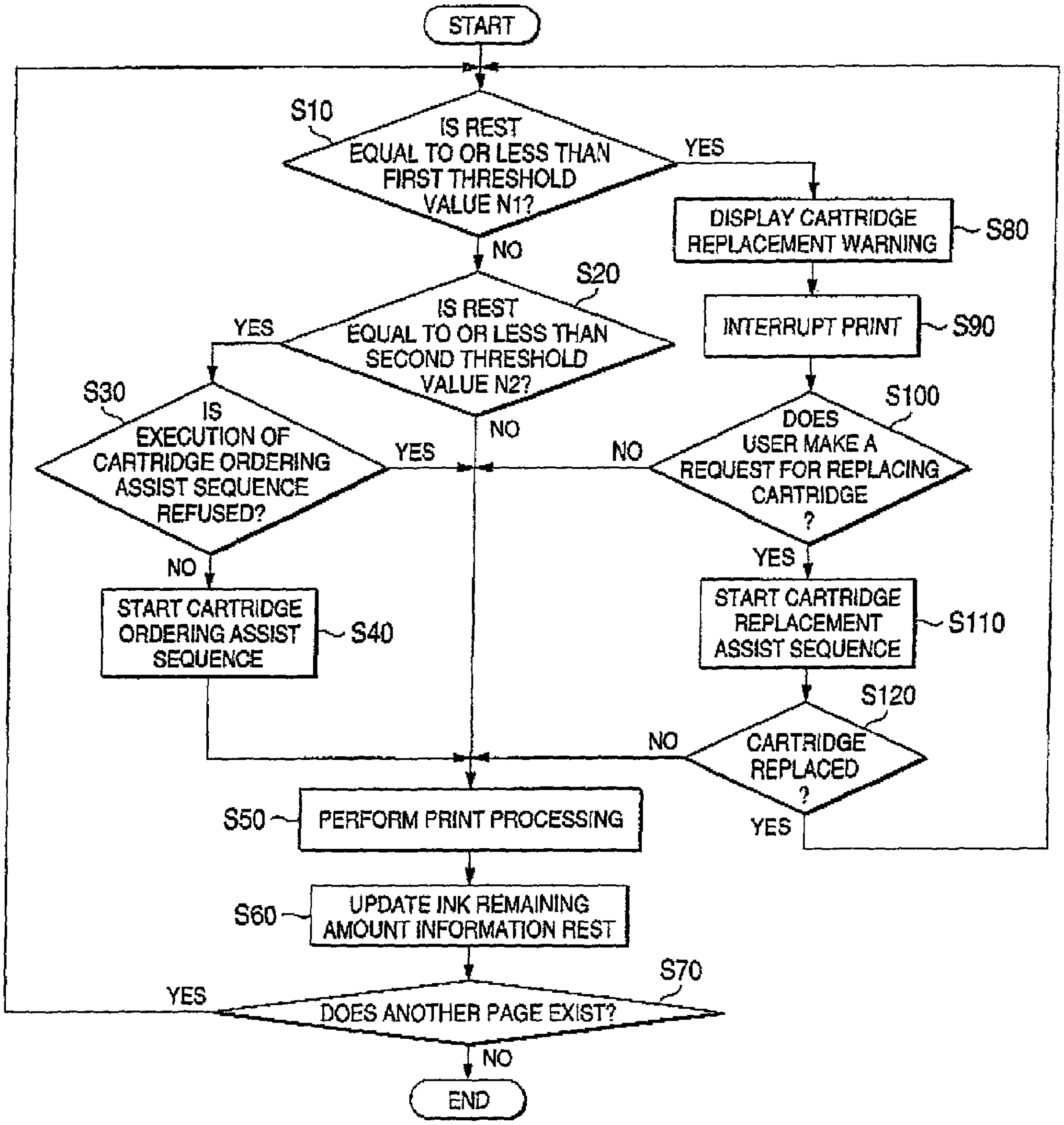
FIG. 3 is a flowchart to describe the whole operation.

In FIG. 3, when the user instructs to print an image for the print data P_DATA, the central processing section 110 determines whether or not the value of the ink remaining amount information REST with respect to the ink cartridge becomes equal to or less than a first threshold value N1 (S10). The first threshold value N1 is set smaller than a second threshold value N2 described later. The value indicated by the ink remaining amount information REST is set so that as the ink remaining amount becomes lower, the value becomes smaller. Here, as for the value of the ink remaining amount information REST, the ink amount obtained by counting the number of ink drops ejected through the print head and the amount of ink ejected through the print head using suction unit (not shown) at the cleaning time can be added together to obtain the value of the ink consumption amount, namely, the ink remaining amount is defined by taking the ink amount in unused cartridge from the ink consumption amount.

Specifically, the central processing section 110 determines, with reference to the value of the ink remaining amount information REST stored in the ink remaining amount information area 902 in the IC memory 901, whether the ink remaining amount in the ink cartridge 900 is an amount to such an extent that the ink cartridge should be immediately replaced, namely, determines whether or not the value of the ink remaining amount information REST recorded in the ink remaining amount information area 902 is equal to or less than the first threshold value N1.

When the value of the ink remaining amount information REST is greater than the first threshold value N1, further determination is made on whether or not the value is equal to or less than the second threshold value N2 (S20) That is, the central processing section 110 determines, with reference to the value of the ink remaining amount information REST stored in the ink remaining amount information area 902, whether or not the ink remaining amount in the ink cartridge 900 is an amount to such an extent that the ink cartridge should be shortly replaced (for example, about 10% of the ink amount in the ink cartridge just after purchased), namely, determines whether or not the value of the ink remaining amount information REST recorded in the ink remaining amount information area 902 is equal to or less than the second threshold value N2.

When the value of the ink remaining amount information REST is greater than the second threshold value N2, the central processing section 110 starts print processing (S50). On the other hand, when the value of the ink remaining amount information REST is equal to or less than the second threshold value N2, namely, when the value of REST is greater than N1 and equal to or less than N2, the central processing section 110 determines whether or not execution of a cartridge ordering assist sequence is refused (S30). Refusal of execution of the cartridge ordering assist sequence is registered in a nonvolatile storage area (nonvolatile register R) (not shown) if the user already keeps an ink cartridge in stock in hand. If execution of the cartridge ordering assist sequence is not refused, a message of "the remaining amount in the ink cartridge becomes low. Assist sequence is executed" or the like is displayed, while the cartridge ordering assist sequence (cartridge ordering assist program) described later is started (S40) and print processing at step S50 is started. In contrast, if execution of the cartridge ordering assist sequence is refused, print processing at step S50 is started without starting the cartridge ordering assist sequence. Whenever one page is printed as print processing at step S50 is performed, the ink remaining amount information REST is updated (S60) and determination is made on whether or not another page to be printed exists (S70). If next page exists, the process is returned to step S10; if next page does not exist, the processing is terminated. The ink remaining amount information REST may be updated each time one page is printed, as described above; the information REST may be updated each time the value of the ink remaining amount information REST is decreased by a predetermined amount, each time a predetermined number of lines are printed, each time a predetermined number of pages are printed, or each time one print job is executed. The CPU of the central processing section 110 updates the ink remaining amount information REST.

On the other hand, when the value of the ink remaining amount information REST is equal to or less than the first threshold value N1 at step S10, a cartridge replacement warning of "ink cartridge needs to be replaced" or the like is displayed (S80). The warning at step S80 is displayed on the display section 161 of the user interface section 160.

After the cartridge replacement warning is displayed at step S80, the print is interrupted (S90). The subsequent processing varies depending on whether or not the user makes a request for replacing the cartridge (S100).

Figure 4:
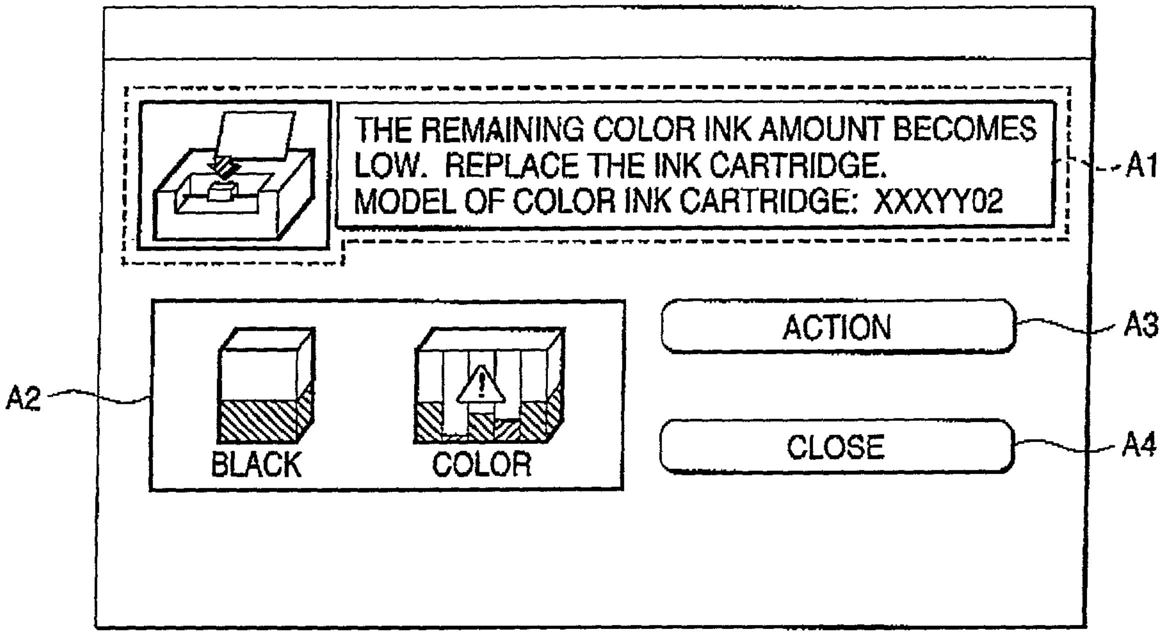
FIG. 4 is a schematic representation to represent an example of a status screen.

FIG. 4 is a drawing to show a display example of the display section 161 at steps S60 to S100 and shows a status screen containing warning display A1 with a comment of "The remaining color ink amount becomes low. Replace the ink cartridge. Model of color ink cartridge: XXXYY02." In FIG. 4, graphics A2 representing the ink cartridges and the ink remaining amount state is displayed and further an "ACTION" soft button A3 and a "CLOSE" soft button A4 are provided. The above-mentioned step S100 branches depending on that the "ACTION" soft button A3 or the "CLOSE" soft button A4 is clicked.

If the user does not make a request for replacing the ink cartridge 900 (for example, the user selects the "CLOSE" soft button A4 in FIG. 4), process is transferred to step S50 and print processing is performed; if the user makes a request for replacing the ink cartridge 900 (for example, the user selects the "ACTION" soft button A3 in FIG. 4), a cartridge replacement assist sequence (cartridge replacement assist program) is started (S110).

The cartridge replacement assist sequence shows an ink cartridge replacement procedure for the user who is unfamiliar with ink cartridge replacement with using graphics etc. The cartridge replacement assist sequence is ended when the user stops replacing the ink cartridge and makes a request for restarting print or when the user replaces the cartridge as he or she intends originally (S120).

At step S120, if finally the user does not replace the ink cartridge, print is restarted and process is transferred to step S50; if the user replaces the ink cartridge, the process is returned to step S10. In the cartridge replacement assist sequence, the central processing section 110 in FIG. 2 refers the serial number of the ink cartridge recorded in the IC memory 901, for example, so that determination of whether or not the ink cartridge has been replaced can be executed.

Figure 5:
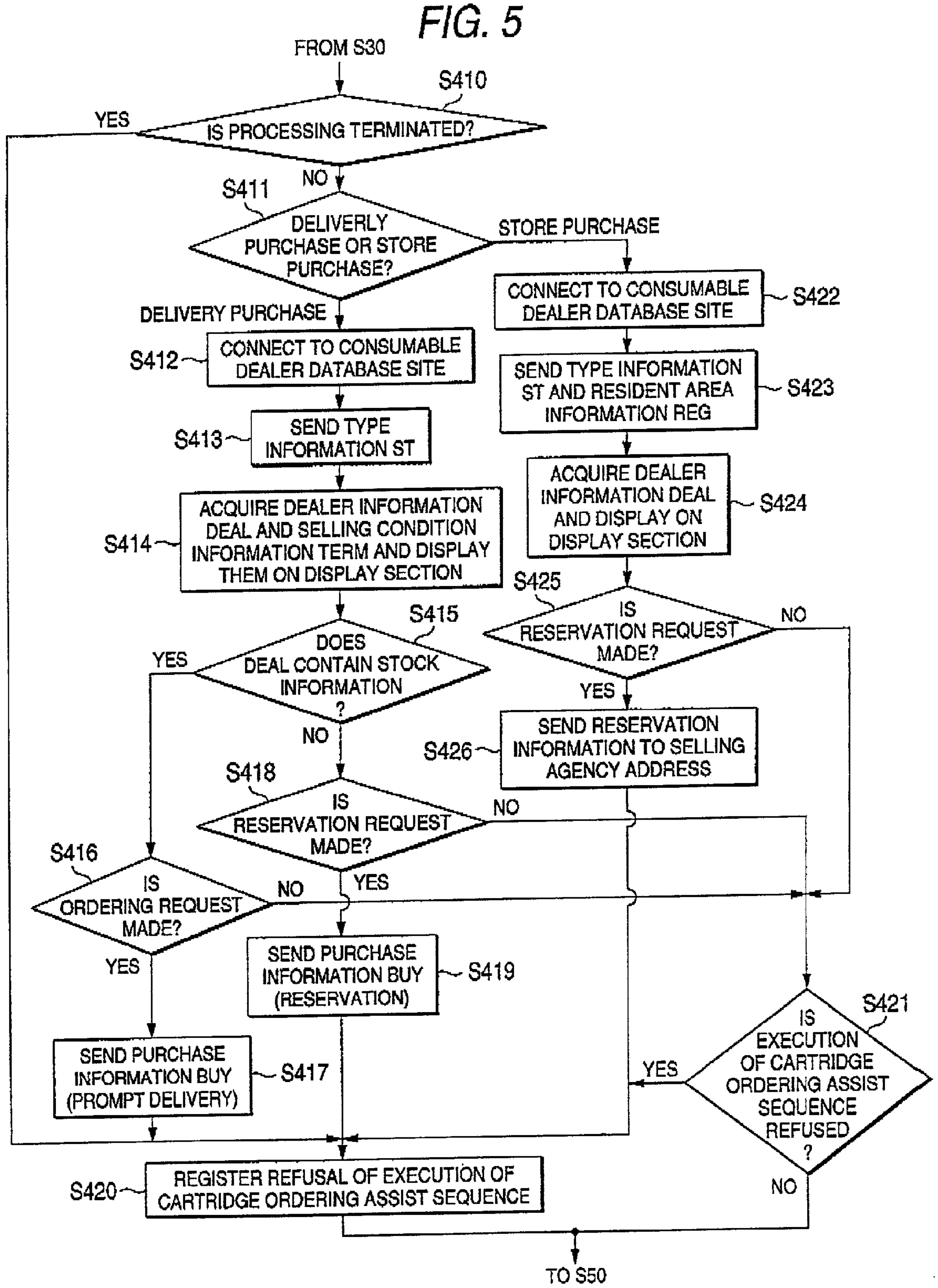
FIG. 5 is a flowchart to show a cartridge ordering assist sequence.

FIG. 5 is a flowchart to show processing at step S40 in FIG. 3 in detail. In FIG. 5, when the cartridge ordering assist program is started, first waiting is made for the user to specify whether or not the cartridge ordering assist program is to be continued (S410). If the user gives an instruction for continuing the cartridge ordering assist sequence, further waiting is made for the user to specify whether or not he or she makes a delivery purchase request (S411). If the user gives an instruction for stopping the cartridge ordering assist sequence, refusal of execution of the cartridge ordering assist sequence is registered in the above-mentioned register R (not shown) (S420).

Specifically, a menu for having the user selecting delivery purchase or store purchase is displayed on the display section 161 of the user interface section 160.

Figure 6:
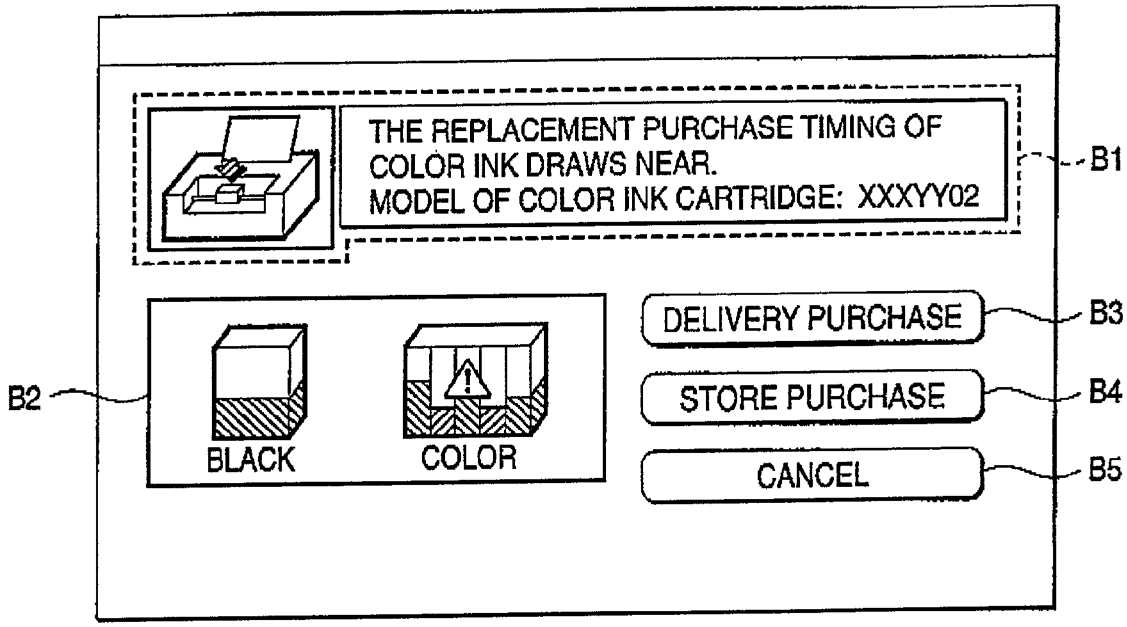
FIG. 6 is a drawing to show a display example of a display section at step S411.

FIG. 6 is a drawing to show a display example of the display section 161 at step S411 (status screen) wherein display B1 with a comment of "The replacement purchase timing of color ink draws near. Model of color ink cartridge: XXXYY02," graphics B2 representing the ink cartridges and the ink remaining amount state, a "DELIVERY PURCHASE" soft button B3, a "STORE PURCHASE" soft button B4, and a "CANCEL" button B5 are provided. If the "CANCEL" button B5 is clicked, then the message is not displayed and refusal of execution of the cartridge ordering assist sequence is registered at S420 described later and process is transferred to step S50 in FIG. 3.

Figure 7:
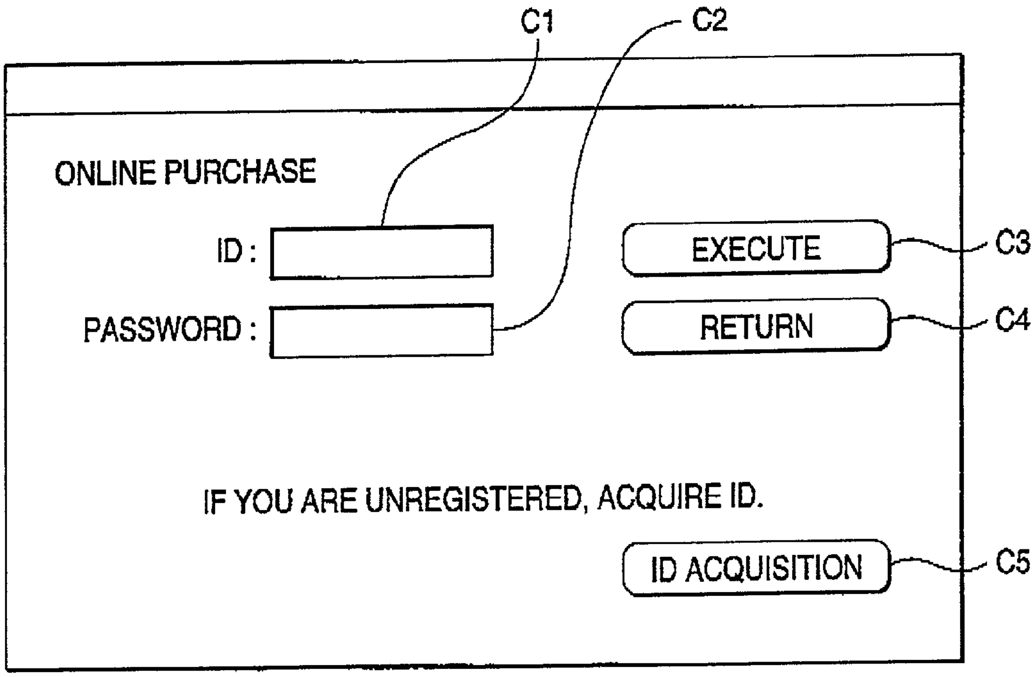
FIG. 7 is a drawing to show a menu for determining user's qualification.

If either of the "DELIVERY PURCHASE" soft button B3 and the "STORE PURCHASE" soft button B4 is clicked in FIG. 6, a menu for determining user's qualification shown in FIG. 7 is displayed. The display section 161 in FIG. 7 contains an ID input field C1, a password input field C2, an "EXECUTE" soft button C3, a "RETURN" soft button C4, and an "ID ACQUISITION" soft button C5. When the ID and the password are valid and the "EXECUTE" soft button C3 is clicked, process advances to the next step. When the ID or the password is invalid and the "EXECUTE" soft button C3 is clicked, a comment of "ID or password is incorrect." (not show) or the like is displayed and process cannot advance to the next step. When the "RETURN" soft button C4 is clicked, the menu screen in FIG. 7 is returned to the screen in FIG. 6. If the user is unregistered he or she can become the formal registered user by clicking the "ID ACQUISITION" soft button C5.

If the user requests a delivery purchase, the print apparatus 100 is connected to the consumable dealer database site 600 (see FIG. 1) (S412). When the print apparatus 100 is connected to the site 600, type information ST is sent to the site (S413). After this, the print apparatus 100 acquires dealer information DEAL and selling condition information TERM from the consumable dealer database site 600 and displays them on the display section (S414).

The dealer information DEAL contains various conditions of the dealer name, stock, etc. The selling condition information TERM contains various conditions of the selling price, a condition as to whether or not the used ink cartridge is to be collected, the delivery time, etc.

Figure 8:
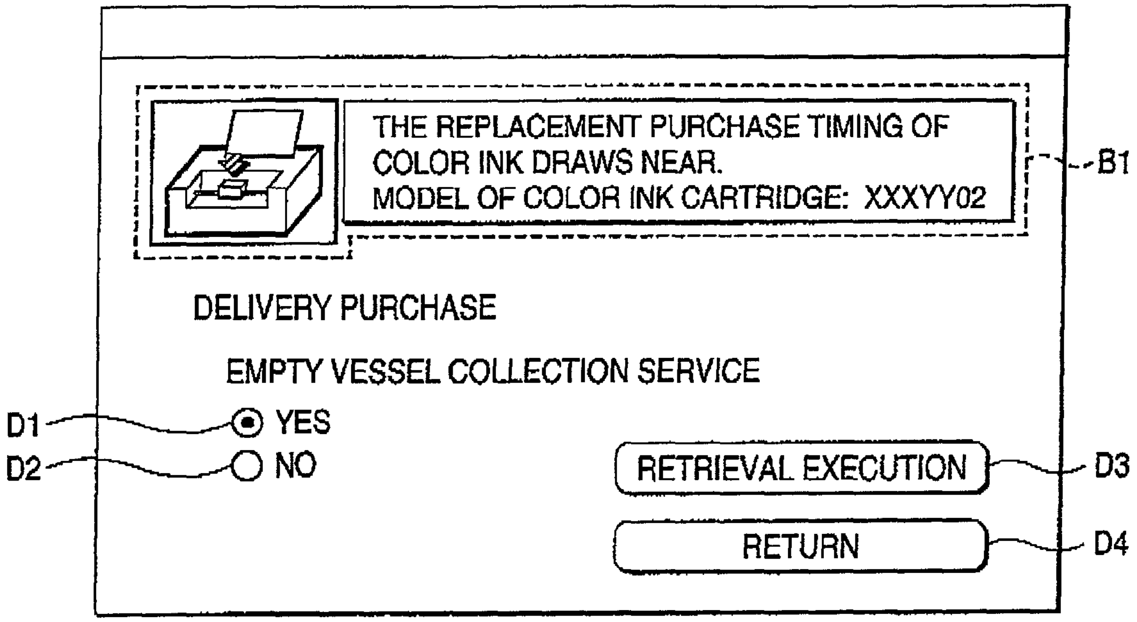
FIG. 8 is a drawing to show a display example of the display section at step S414.

FIG. 8 is a drawing to show a display example of the display section 161 at step S414 (status screen). The display section 161 displays display B1 in FIG. 8, "EMPTY VESSEL COLLECTION SERVICE" "YES" radio button D1 and "NO" radio button D2, a "RETRIEVAL EXECUTION" soft button D3, and a "RETURN" soft button D4. In this case, when the "EMPTY VESSEL COLLECTION SERVICE YES" radio button D1 is made active and the "RETRIEVAL EXECUTION" soft button D3 is clicked, the display of the display section 161 is changed to the screen shown in FIG. 9 described later. Data indicating whether or not the empty vessel collection service is requested can be previously registered in a predetermined register.

Next, determination is made on whether or not the dealer information DEAL contains "in stock information" (S415). If the dealer information DEAL contains the in stock information, processing is performed in response to whether or not the user makes a request for ordering (S416). If the dealer information DEAL does not contain the in stock information, processing is performed in response to whether or not the user makes a reservation request (S418).

If a request for ordering is made at step S416, purchase information BUY (prompt delivery) is sent to the consumable dealer database site 600 (S417) and refusal of execution of the cartridge ordering assist sequence is registered in the register R (not shown) (S420), then control is transferred to step S50 in FIG. 3.

If a request for reservation is made at step S418, purchase information BUY (reservation) is sent to the consumable dealer database site 600 (S419) and refusal of execution of the cartridge ordering assist sequence is registered in the predetermined register R (S420), then control is transferred to step S50 in FIG. 3.

If a request for ordering is not made at step S416 (refusal to order is made) or if a request for reservation is not made at step S418 (refusal to reserve is made), the user is requested to determine whether or not the future execution of the cartridge ordering assist sequence is to be refused (namely, determination is made on whether or not the future execution of the cartridge ordering assist sequence is refused) (S421). Here, when the future execution of the cartridge ordering assist sequence is refused, refusal of execution of the assist sequence is registered in the predetermined register R (S420); when the future execution is not refused, refusal of execution of the assist sequence is not registered and then process is transferred to step S50 in FIG. 3.

Figure 9:
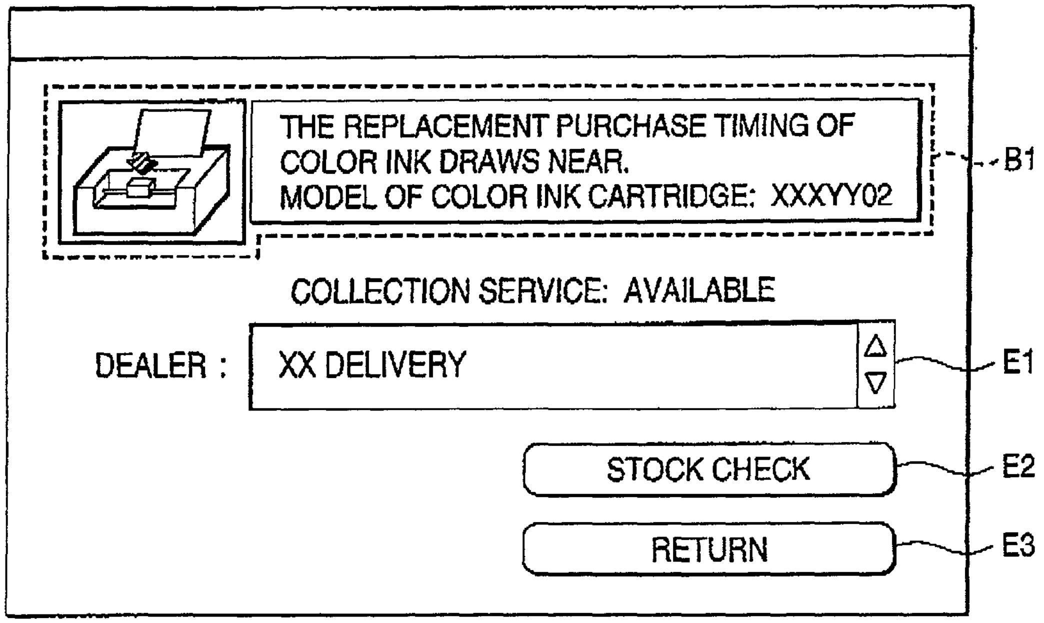
FIG. 9 is a drawing to show display on the display section to determine whether or not "stock information" is contained;.
Figure 10:
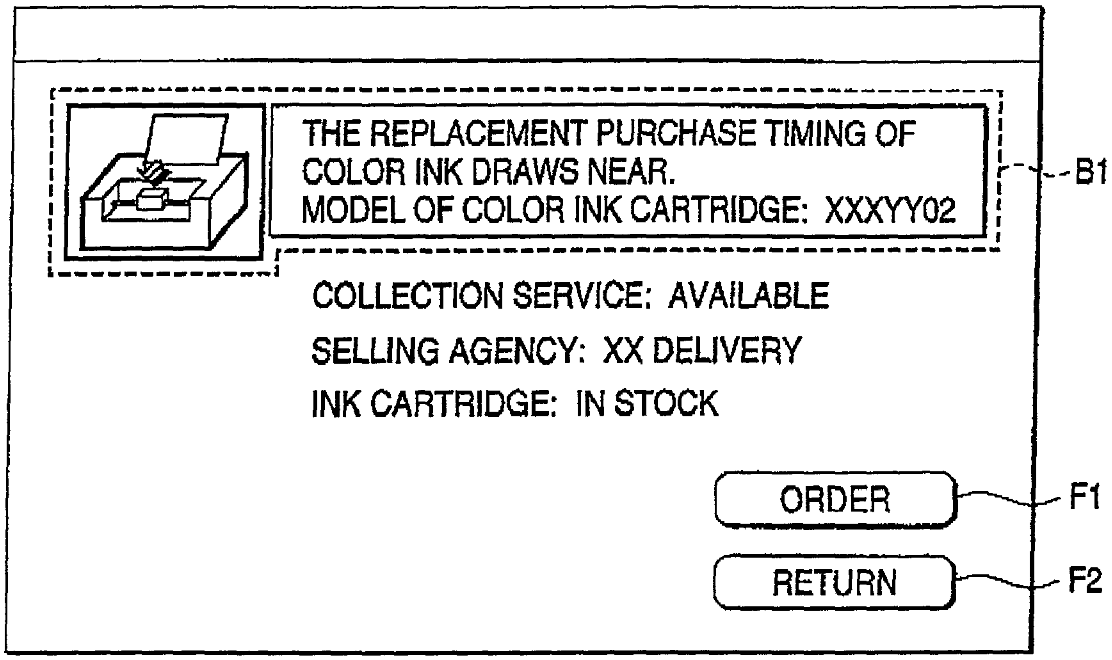
FIG. 10 is a drawing to show display on the display section when a STOCK CHECK soft button is clicked.

FIG. 9 is a drawing to show display on the display section 161 to determine whether or not "in stock information" is contained. The display section 161 displays display B1, a dialog box E1 listing "dealer", a "STOCK CHECK" soft button E2, and a "RETURN" soft button E3 in FIG. 9. If the user clicks on the "STOCK CHECK" soft button E2, whether or not the dealer displayed in the dialog box E1 stocks the ink cartridge is checked. If the ink cartridge is in stock, as shown in FIG. 10, the display on the display section 161 changes to a screen containing display B1, an "ORDER" soft button F1, and a "RETURN" soft button F2. The display section 161 in FIG. 9 may be provided with a "CANCEL" soft button so that when the CANCEL soft button is clicked, the process is returned to step S410 described above.

On the other hand, if the user makes a store purchase request at step S411, the print apparatus 100 is connected to the consumable dealer database site 600 (S422) and type information ST and resident area information REG are sent to the site (S423). After this, dealer information DEAL is acquired from the consumable dealer database site 600 and is displayed on the display section 161 (S424).

After this, the user is requested to determine whether or not he or she makes a reservation request (S425). If the user makes the reservation request, reservation information is sent to the dealer address (for example, mail address) (S426) and process is transferred to step S420. If the user does not make a reservation request, reservation information is not sent and process is transferred to step S421 for requesting the user to determine whether or not the future execution of the cartridge ordering assist sequence is to be refused (namely, for determining whether or not the future execution of the cartridge ordering assist sequence is refused).

Figure 11:
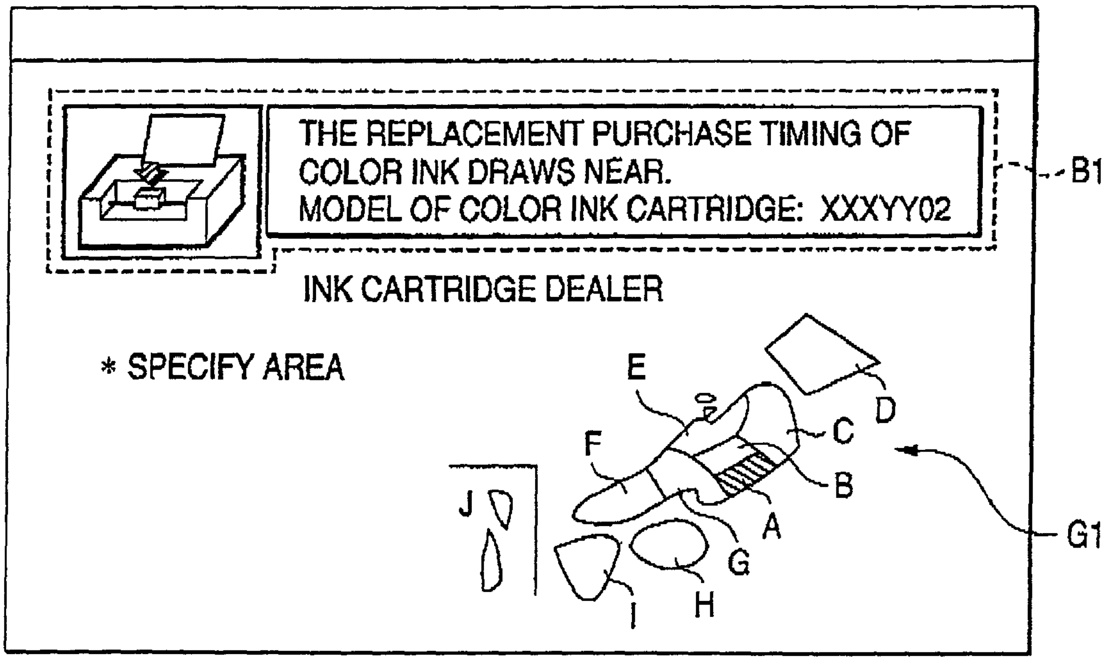
FIG. 11 is a drawing to show a display example of the display section when dealer information is downloaded from a consumable dealer database site.
Figure 12:
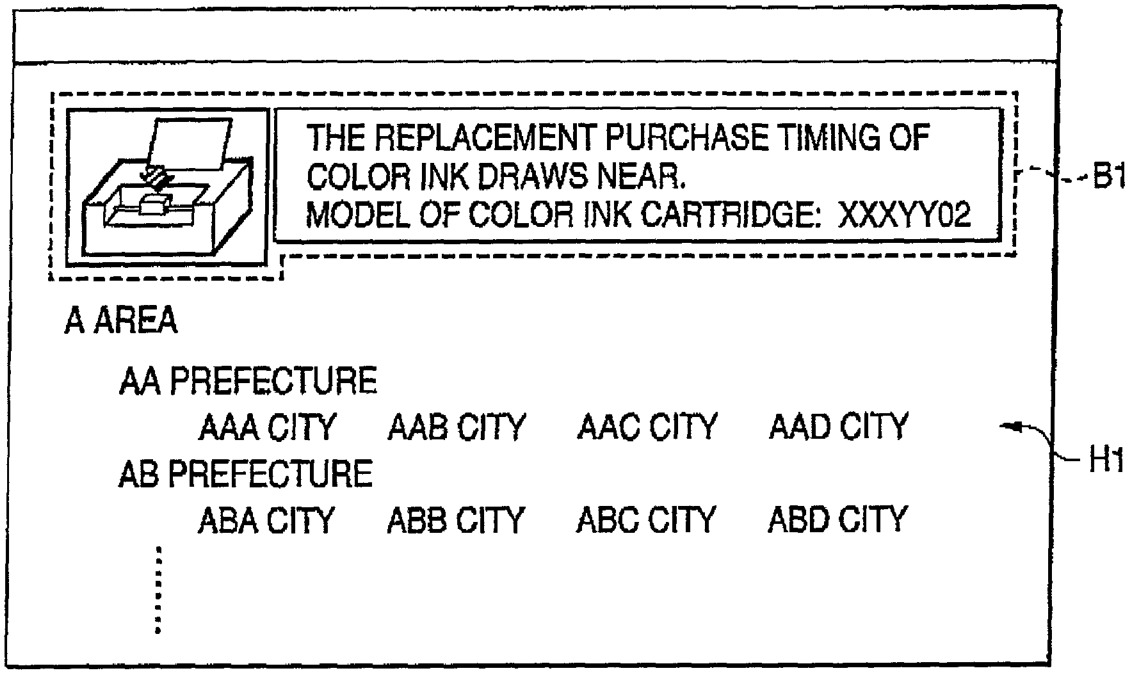
FIG. 12 is a drawing to show display of a list of "prefecture names," "23 wards," and "city names" when the user clicks on Kanto area.
Figure 13:
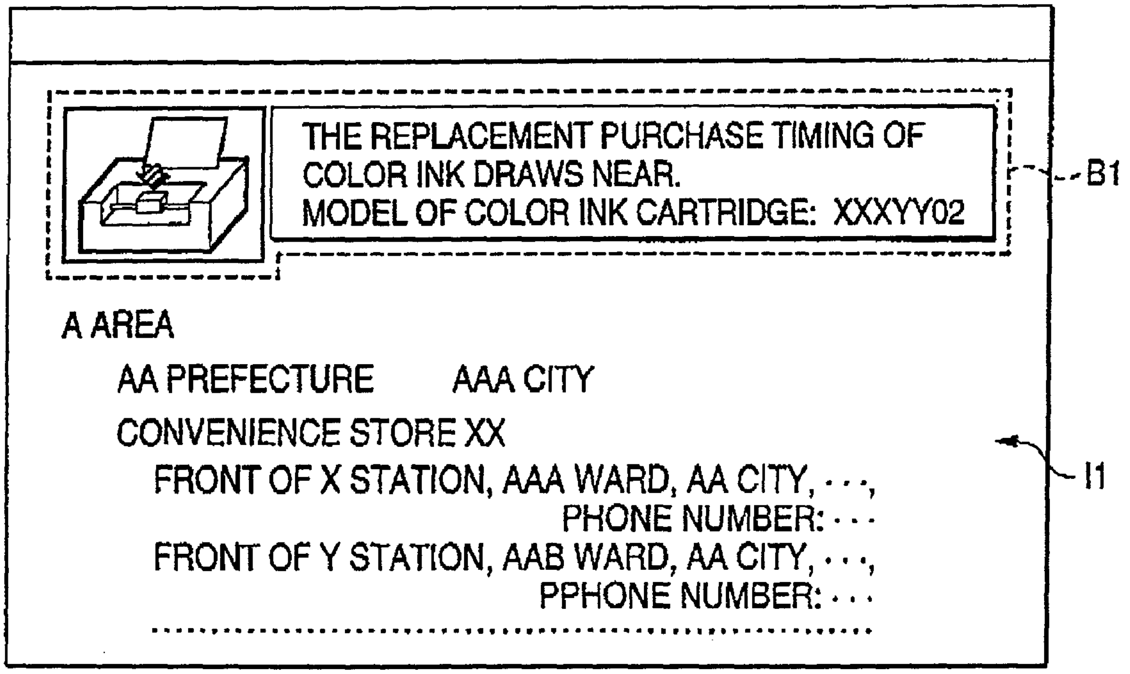
FIG. 13 is a drawing to show display of a "store name" list corresponding to a specific "ward name" clicked by the user out of a list of 23 wards displayed as the user clicks on "23 wards;"

In the embodiment, display shown in FIGS. 11 to 15 can be produced on the display section 161 at steps S423 to S425. FIG. 11 is a drawing to show a display example of the display section when the dealer information DEAL is downloaded from the consumable dealer database site. In FIG. 11, the display B1 with the comment of "The replacement purchase timing of color ink draws near. Model of color ink cartridge: XXXYY02" shown in FIG. 6 is also displayed and in addition, a map GI to specify an ink cartridge agency by area. If the user clicks on A area, for example, on the map, as shown in FIG. 12, a list H1 of "prefecture names" and "administrative jurisdiction area names" ("prefecture names" and "city names" in FIG. 12) in the A area is displayed. Further, if the user clicks on "AAA city", a list of wards in the AAA city appears (not shown). If the user selects a predetermined ward out of the list, a "store name" list I1 corresponding to the corresponding "ward name" is displayed as shown in FIG. 13.

Figure 14:
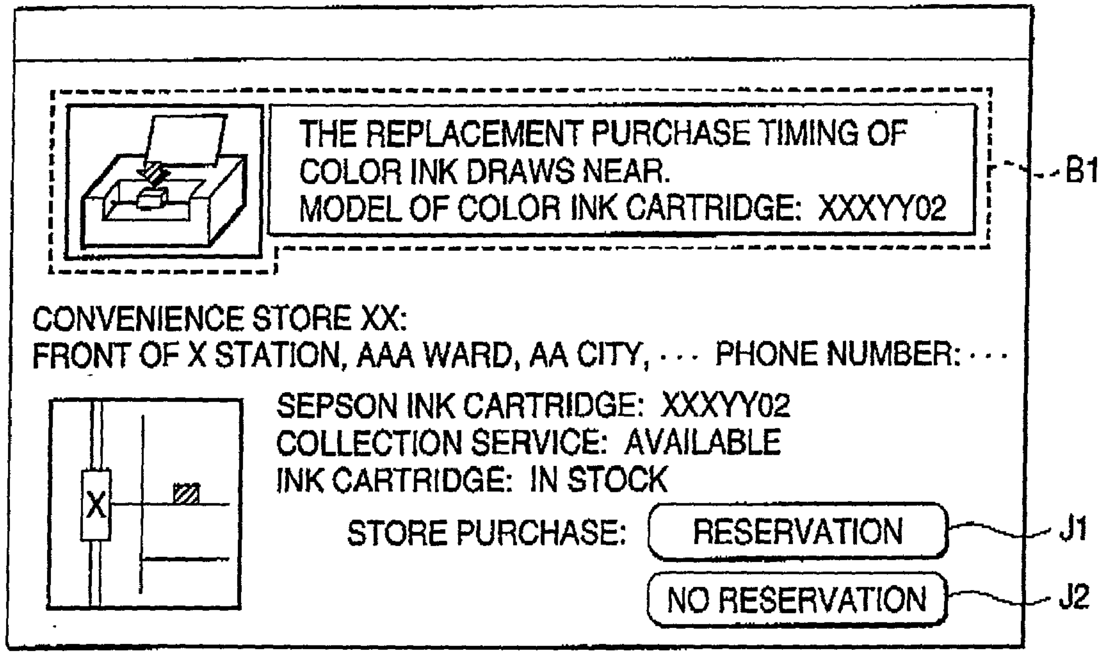
FIG. 14 is a drawing to show display of "store name" address, map, selling conditions, a RESERVATION soft button, and a RETURN soft button when the user clicks on a specific "store name" out of the "store name" list.
Figure 15:
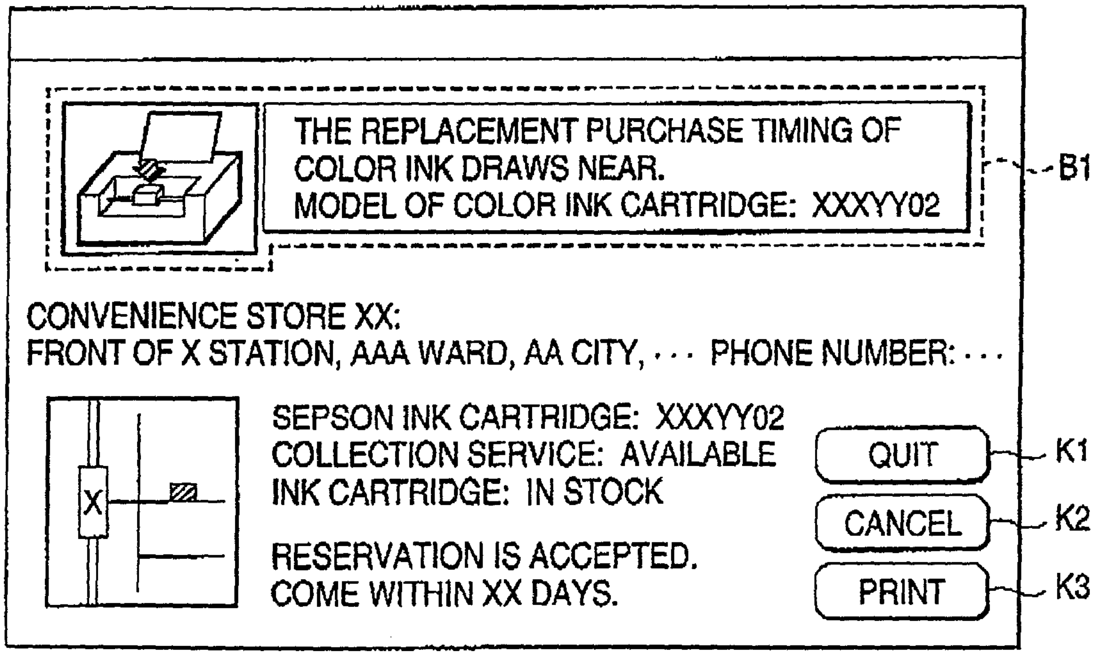
FIG. 15 is a drawing to show display of a QUIT soft button and a PRINT soft button when the user clicks on the RESERVATION soft button.

If the user clicks on a specific "store name" out of the "store name" list I1 in FIG. 13, the display S1 shown in FIG. 6, the address of the specific "store name", a map, selling conditions (here, collection service available or unavailable and in stock or out of stock), a store purchase "RESERVATION" soft button J1, and a "RETURN" soft button J2 are displayed as shown in FIG. 14. If the user clicks on the "RESERVATION" soft button J1 in FIG. 14, a "QUIT" soft button K1, a "CANCEL" soft button K2, and a "PRINT" soft button K3 can also be displayed on the display section 161 as shown in FIG. 15. If the user clicks on the "QUIT" soft button K1, process is transferred to step S426. If the user clicks on the "PRINT" soft button K3, print processing is interrupted and the map, the selling store address and the like displayed such as in FIG. 14 or 15 are printed.

Here, the correspondence between the components of the embodiment and those of the present invention will be discussed. The print apparatus 100 (particularly the printer section 140) of the embodiment corresponds to the print apparatus in the present invention, the display section 161 of the user interface section 160 corresponds to display unit, and the central processing section 110 corresponds to control unit.

According to the embodiment described above in detail, the status screen indicating the consumption degree of an ink cartridge, a consumable of the print apparatus 100 is displayed on the display section 161 and the "DELIVERY PURCHASE" button and the "STORE PURCHASE" button as options for the purchase mode of the ink cartridge are displayed in the status screen, so that the user can select the purchase mode meeting his or her will from among a plurality of options displayed in the status screen for purchasing the consumable. Particularly, the user can comparatively consider the merits and demerits of delivery purchase and store purchase and select the purchase mode meeting his or her will in response to the circumstances.

The user may check the consumption degree in the graphics B2 representing each ink cartridge and the ink remaining amount on the status screen before determining whether or not he or she purchases the ink cartridge; this point is convenient for the user.

Further, when the ink remaining amount in the ink cartridge becomes equal to or less than the second predetermined threshold value N2, it is determined that it becomes necessary to replace the ink cartridge with a new one, and the cartridge ordering assist sequence (S40, see FIG. 5) is started, so that the appropriate replacement timing can be determined.

Further, if the user selects the "DELIVERY PURCHASE" button, the ordering screens (FIGS. 7 to 10) for ordering the ink cartridge are acquired from the Web server 620 and are displayed on the display section 161, so that the user can purchase the ink cartridge as online shopping by performing easy operation. At this time, the ordering screens are provided with the selling condition input field to specify EMPTY VESSEL COLLECTION SERVICE "YES" or "NO" (see FIG. 8) and the selling condition disclosure field indicating COLLECTION SERVICE: AVAILABLE (see FIG. 9), so that ease of use is provided for the user. On the other hand, if the user selects the "STORE PURCHASE" button, screens representing the dealer information (FIGS. 11 to 14) are acquired from the Web server 620 and are displayed on the display section 161, so that the user can easily get the dealer information and thus can use the dealer information as a guideline for determining which dealer is suitable for purchasing the consumable. At this time, the dealer information contains at least either of address information and map information for finding out where the dealer is, so that the user can select the dealer who deals in the consumable near to the place where the user lives in, for example. The user clicks on A area in the map G1 in FIG. 11 and this operation corresponds to input of his or her place retrieval key information.

Second Embodiment

Figure 16:
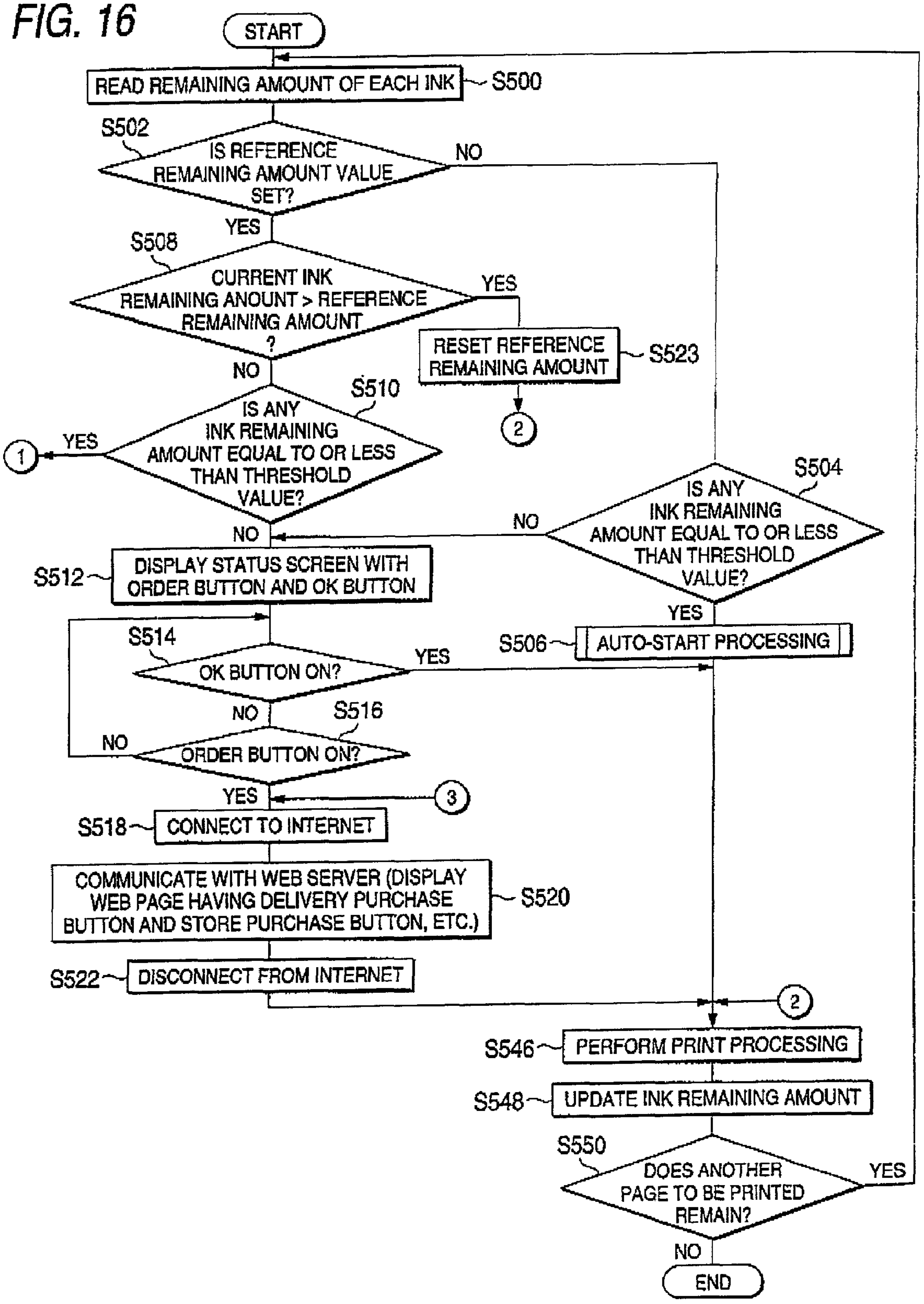
FIG. 16 is a main flowchart of a second embodiment of the invention.
Figure 17:
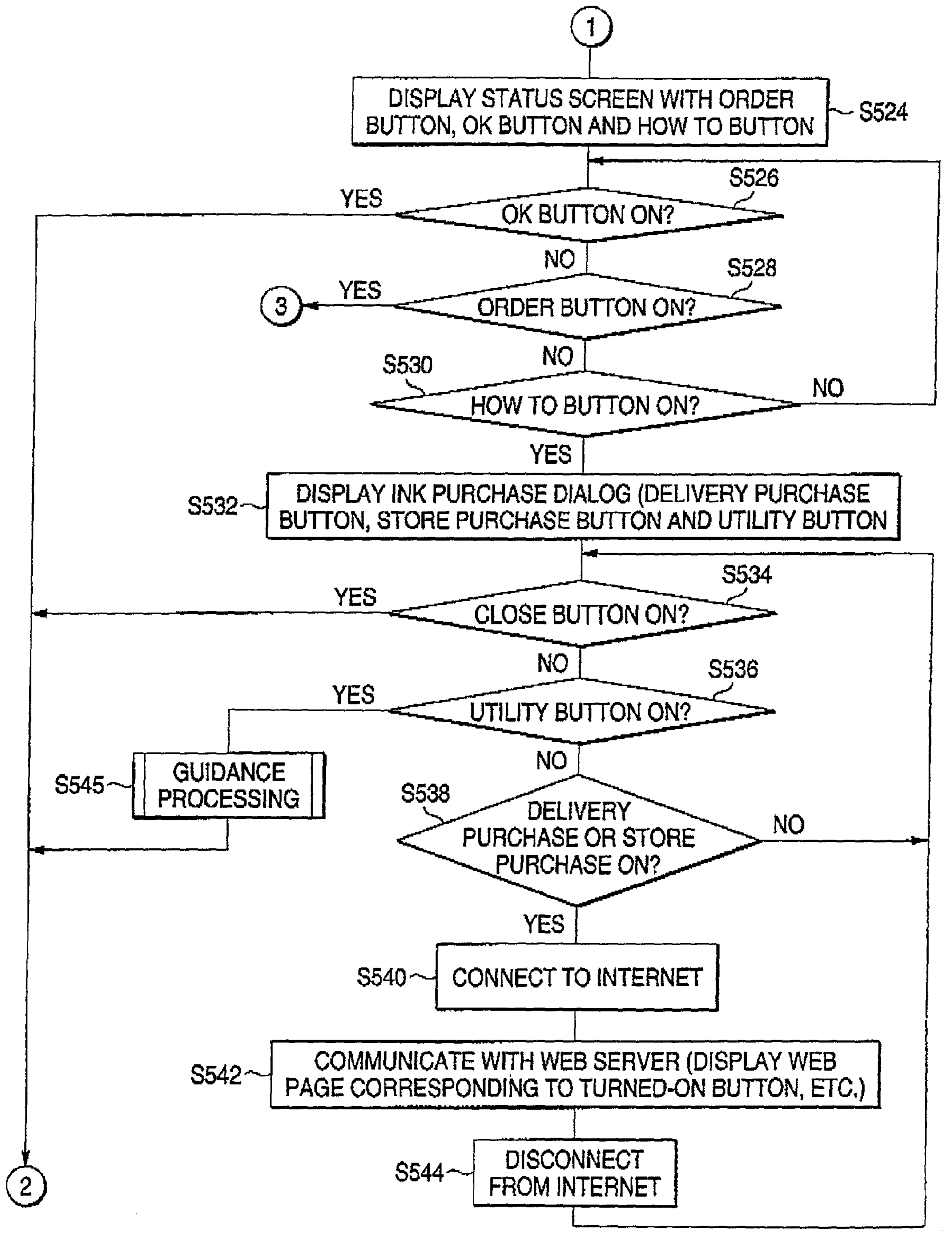
FIG. 17 is a main flowchart of the second embodiment of the invention (continued from FIG. 16)
Figure 18:
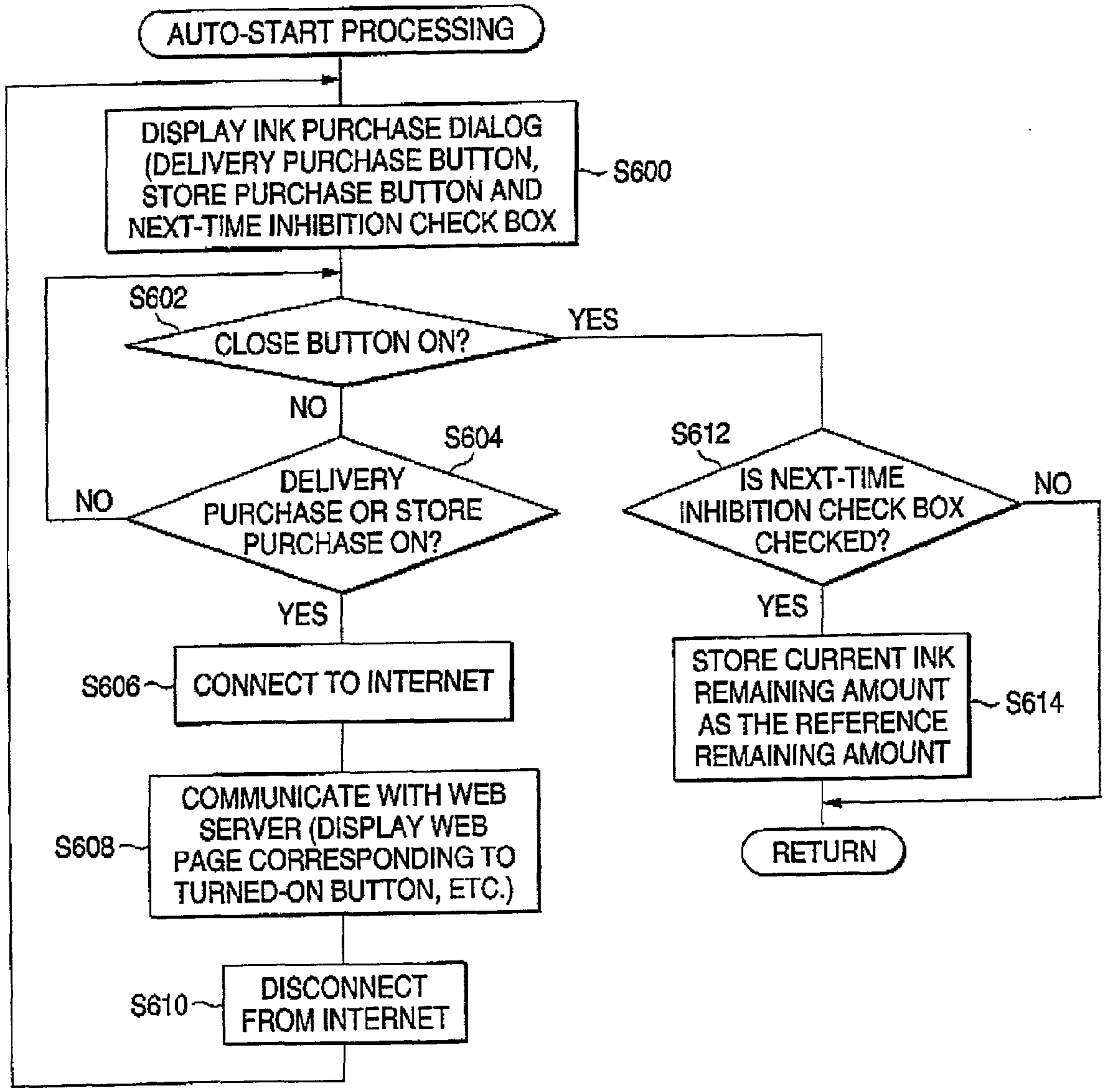
FIG. 18 is a flowchart of an auto-start processing routine.

A second embodiment of the invention has the same configuration as in the first embodiment and differs from the first embodiment only in operation. Therefore, the operation will be discussed with reference to FIGS. 19 to 24 based on flowcharts of FIGS. 16 to 18.

When the user enters a print command through an operation section 162 of a user interface section 160, the central processing section 110 reads and executes a program of the main flow. First, the remaining amounts of black ink and each color ink are read (step S500) and determination is made on whether or not a reference remaining amount value is set in a predetermined area of the IC memory 901 in the ink cartridge 900 (step S502). This reference remaining amount value is in reset state at the initialization time. In auto-start processing described later, when the user turns on a check box representing "auto-start inhibition until ink replacement" on an ink ordering screen, the current ink remaining amount is set. It means that auto-start is inhibited when the ink remaining amount is set in the reference remaining amount value. That is, it is seen that auto-start is inhibited or auto-start inhibition is released depending on whether the reference remaining amount value is set or reset.

If the reference remaining amount value is reset at step S502, auto-start is not inhibited and thus determination is made on whether or not any of the ink remaining amounts is equal to or less than a predetermined threshold value (step S504). If any ink remaining amount is equal to or less than the predetermined threshold value, an auto-start processing routine described later in detail is executed (step S506) and then one-page print processing is executed (step S546). Next, each ink remaining amount is updated (step S548) and determination is made on whether or not an unprinted page remains (step 550). If an unprinted page remains, control returns to step S500; if no unprinted page remains, the program is terminated.

Figure 19:
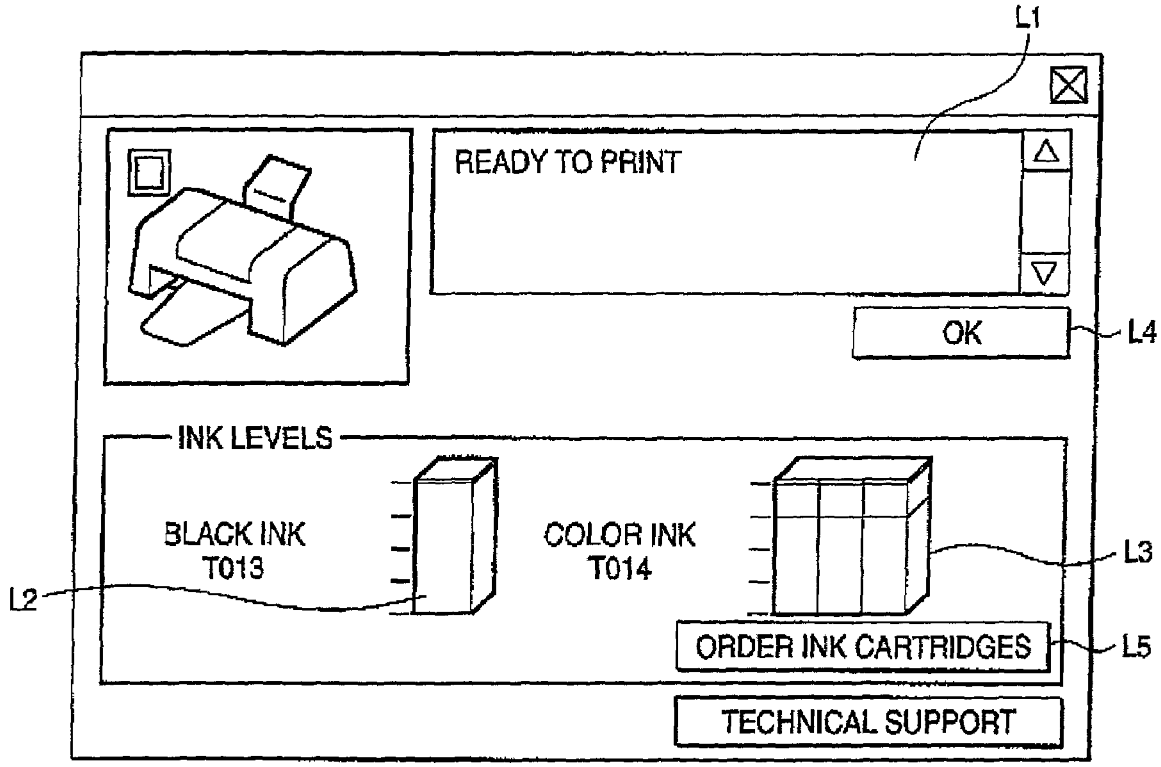
FIG. 19 is a status screen displayed when every ink remaining amount exceeds a threshold value.

On the other hand, if every ink remaining amount exceeds the threshold value at step S504, it is assumed that ink replacement is not required, and a status screen shown in FIG. 19 is displayed on the display section 161 (step S512). The status screen displays a message field L1 for displaying various messages based on the current ink remaining amounts, a black ink remaining amount meter L2 displaying the remaining amount level of black ink as a tank, a color ink remaining amount meter L3 displaying the remaining amount of each color ink as a meter, an "OK" button L4 to be turned on for giving a print processing execution instruction, and an order button L5 to be turned on for ordering ink. Here, every ink remaining amount is a level not hindering print and thus a message of "Ready to print" is displayed in the message field L1.

Determination is made on Whether or not the user turns on the "OK" button L4 is determined (step S514). If the user turns on the "OK" button L4, processing at step S546 and the later is performed. If the user does not turn on the "OK" button L4, determination is made on whether or not the user turns on the order button L5 (step S516). If the user does not turn on the order button L5, control returns to step S514. If the user turns on the order button L5, print apparatus 100 is connected to the Internet (step S518) and is connected to a Web server 620 and a Web page having a delivery purchase button and a store purchase button is acquired and is displayed on the display section 161 and data is transmitted to and received from the Web server 620 (step S520). Then, the print apparatus 100 is disconnected from the Internet (step S522) and processing at step S546 and the later is performed.

Here, the data transmission to and the reception from the Web server 620 at step S520 will be discussed briefly. The Web server 620 to which the print apparatus 100 is connected is an ink cartridge purchase site. The print apparatus 100 first acquires and displays a top page P1 shown in FIG. 20. The top page P1 includes an input field of the model name of the print apparatus 100. The model name is automatically transmitted from the print apparatus 100 to the Web site 620 at the beginning when the print apparatus 100 is connected to the Web server 620, and is displayed on a screen of the display section 161 in a state that it is already entered. The Web server 620 retrieves and returns the model of black ink and the models of color inks and thus the models of the inks with reference to automatically transmitted model name, so that delivery purchase buttons of black ink, color ink, and both inks, and a store purchase button are displayed on the top page P1.

If the user selects any of the delivery purchase buttons on the top page P1, the print apparatus 100 transmits it to the Web server 620 and acquires and displays a page P2 from the Web server 620. The page P2 displays the selling price corresponding to the ink, a zip code input field, and a delivery method selection field. If the user enters the zip code in the zip code input field and a delivery method in the delivery method selection field and then selects a recalculate button, the print apparatus 100 transmits the data to the Web server 620 and acquires and displays an update screen containing the tax responsive to the region of the zip code, the transportation charge responsive to the delivery method, and the total amount of money from the Web server 620. After this, if the user selects an order button, the print apparatus 100 transmits it to the Web server 620 and acquires and displays a login screen comprising ID and password input fields from the Web server 620 and then the user orders the ink cartridge. Thus, the user can purchase the ink cartridge as online shopping by performing easy operation.

On the other hand, if the user selects the store purchase button on the top page P1, the print apparatus 100 transmits it to the Web server 620 and acquires and displays a page P3 from the Web server 620. The page P3 displays the model of the print apparatus, a country name selection field, and a zip code input field. If the user enters any desired country name in the country name selection field and the zip code in the zip code input field and then select a retrieve button, the print apparatus 100 transmits the data to the Web server 620 and acquires and displays a page P4 from the Web server 620. The page P4 lists the stores in and around the region corresponding to the zip code in the country. A map button is attached to each store. If the user clicks on the map button, the place where the store is, is displayed on the map. Thus, the user can visit at the desired store relying on the map and purchase the ink cartridge at the store.

Figure 20:
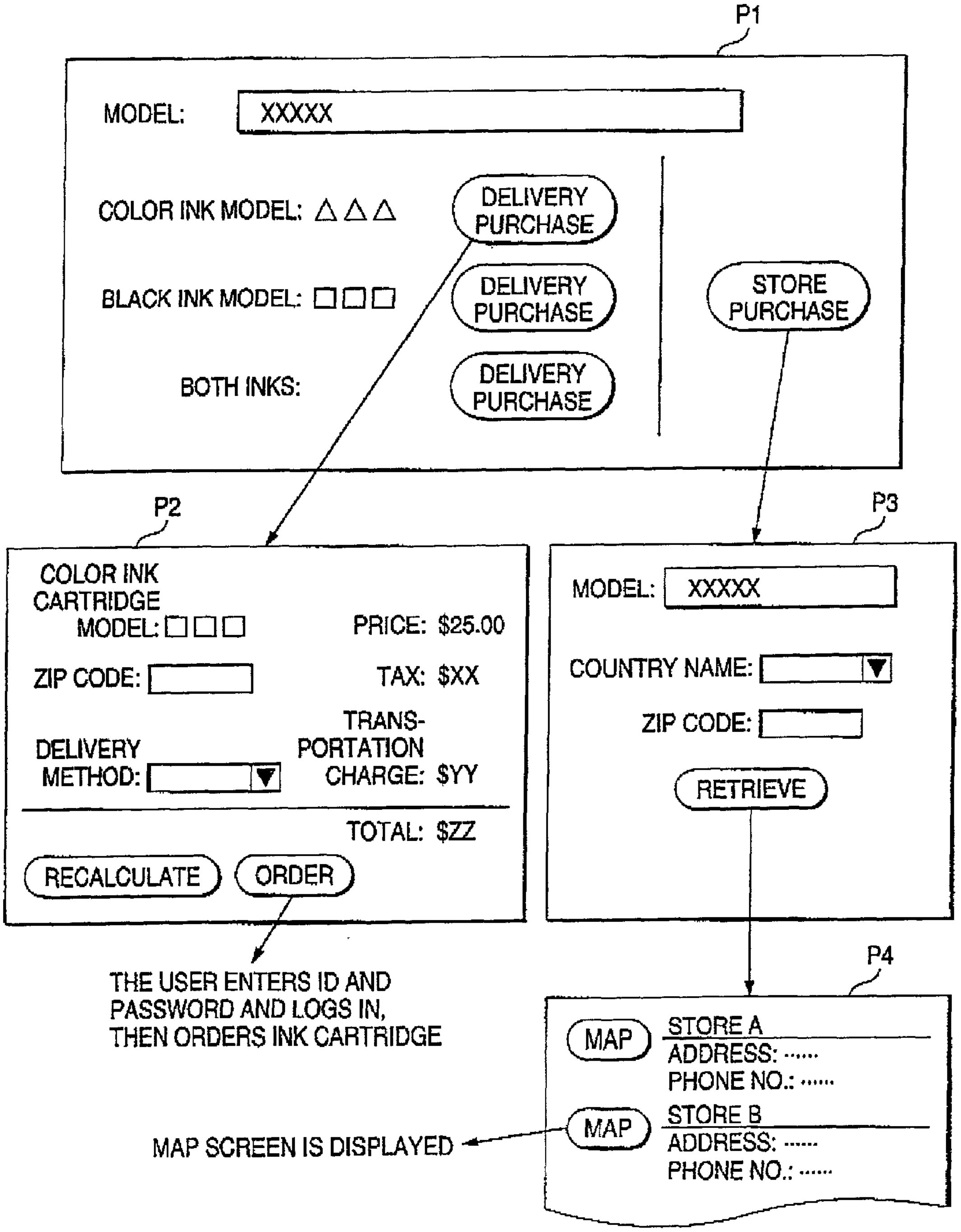
FIG. 20 is a schematic representation to represent transition of Web pages.
Figure 21:
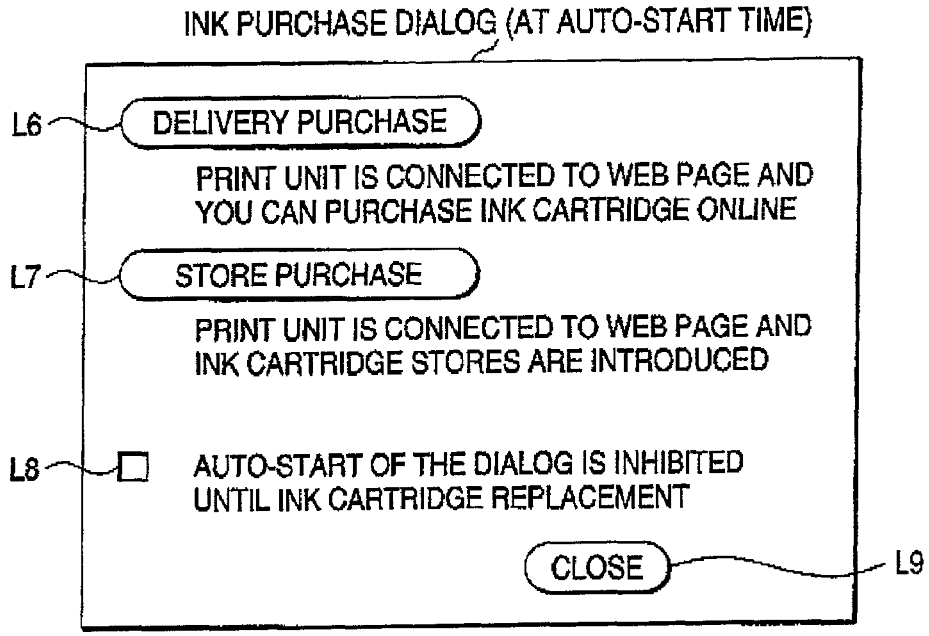
FIG. 21 is a schematic representation of an ink purchase dialog (at auto-start time)

If any of the ink remaining amounts is equal to or less than the threshold value at step S504, an auto-start processing routine for automatically displaying an ink purchase dialog on a screen is executed (step S506). The auto-start processing routine will be discussed with reference to FIG. 18. First, an ink purchase dialog including a delivery purchase button L6, a store purchase button L7, a next-time inhibition check box L8, and a "CLOSE" button L9 (see FIG. 21) is displayed on the display section 161 (step S600) Determination is made on whether or not the user turns on the "CLOSE" button L9 (step S602). If the "CLOSE" button L9 is not turned on, determination is made on whether or not the user turns on the delivery purchase button L6 or the store purchase button L7 (step S604). If neither button is turned on, control returns to step S602. If the delivery purchase button L6 or the store purchase button L7 is turned on, the print apparatus 100 is connected to the Internet (step S606), is connected to the Web server 620, acquires the Web page corresponding to the turned-on button (delivery purchase button L6 or store purchase button L7), displays the Web page on the display section 161, and transmits and receives data to and from the Web server 620 (step S608), then is disconnected from the Internet (step S610) and control returns to step S600. At step S608, specifically, if the delivery purchase button L6 is turned on at step S604, the page P2 in FIG. 20 is acquired and displayed; if the store purchase button L7 is turned on, the page P3 in FIG. 20 is acquired and displayed. The pages are as described above. On the other hand, if the "CLOSE" button L9 is turned on at step S602, determination is made on whether or not the user checks the next time inhibition check box L8 (step S612). If the next-time inhibition check box L8 is checked, the current ink remaining amount is set as the reference remaining amount value (step S614) and the routine is terminated. After this, if the user enters a print command, the auto-start processing routine is not executed because the reference remaining amount value is set at step S502. If the next-time inhibition check box L8 is not checked at step S612, the routine is terminated as it is (namely, as the reference remaining amount value remains in reset state). After this, if the user enters a print command, the reference remaining amount value is reset at step S502 and, therefore, the auto-start processing routine is executed if any ink remaining amount is equal to or less than the threshold value.

Figure 22:
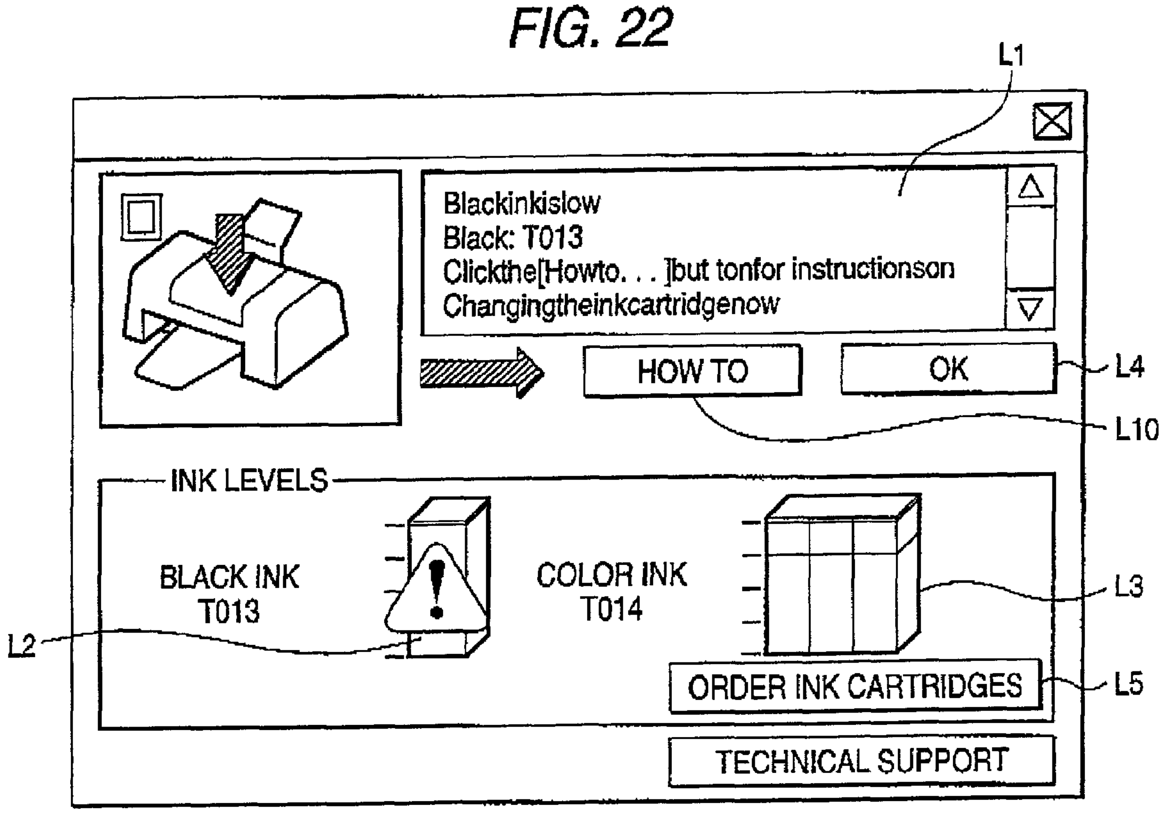
FIG. 22 is a status screen displayed when the black ink remaining amount is equal to or less than a threshold value.
Figure 23:
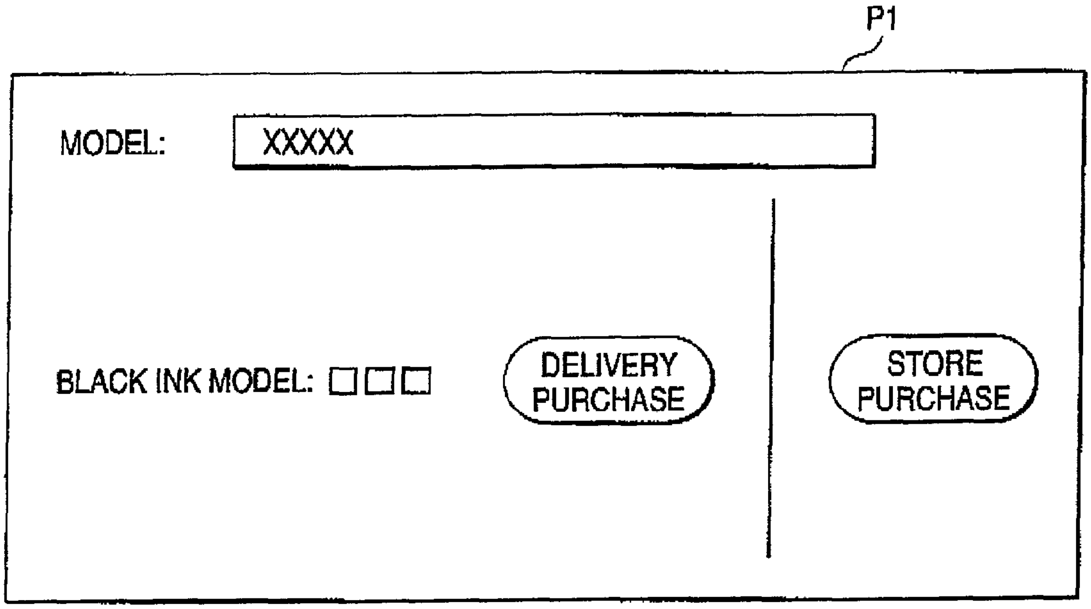
FIG. 23 is a schematic representation to represent a top page in another form of Web page.
Figure 24:
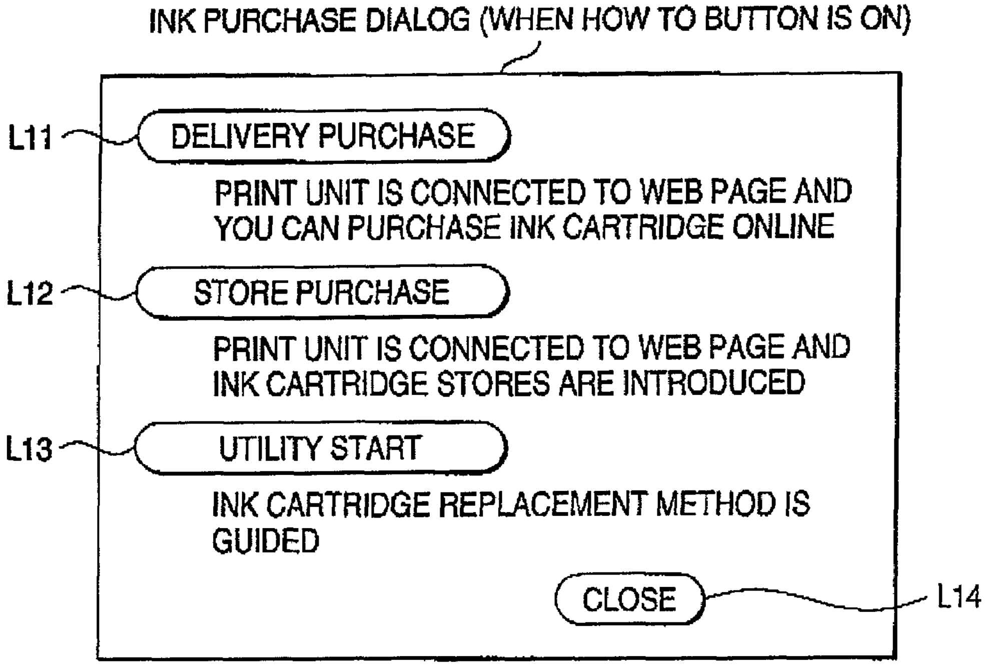
FIG. 24 is a schematic representation of the ink purchase dialog (when a how to button is on)

If the reference remaining amount value is set at step S502, the current ink remaining amount is compared with its reference remaining amount value (step S508). If the former exceeds the latter, it is determined that ink cartridge replacement is accomplished after the auto-start processing routine is executed, so that the reference remaining amount value is reset, and inhibition of the auto-start processing routine is released (step S523), then print processing, etc., at step S546 and the later is executed. As a result, when any ink remaining amount again becomes equal to or less than the threshold value, the auto-start processing routine is executed. On the other hand, if the current ink remaining amount is equal to or less than the reference remaining amount value at step S508, determination is made on whether or not any ink cartridge has an ink remaining amount equal to or less than the threshold value (step S510). If no ink cartridges have an ink remaining amount equal to or less than the threshold value, the processing at step S512 and the later is executed. If any ink cartridge has an ink remaining amount equal to or less than the threshold value, it is assumed that ink cartridge replacement is required, and a status screen shown in FIG. 22 is displayed on the display section 161 (step S524, see FIG. 17). The status screen displays a message field L1 for displaying various messages based on the current ink remaining amounts, a black ink remaining amount meter L2 displaying the remaining amount level of black ink as a tank, a color ink remaining amount meter L3 displaying the remaining amount of each color ink as a meter, an "OK" button L4 to be turned on for giving a print processing execution instruction, an order button L5 to be turned on for ordering ink, and a "HOW TO" button L10 to be turned on when the user wants to know action. Here, the black ink remaining amount is a level at which it is feared that it may hinder print, and thus a message of "Black ink is low" is displayed in the message field L1 and an exclamation mark (!) is displayed in the black ink remaining amount meter L2.

Determination is made on whether or not the user turns on the "OK" button L4 (step S526). If the "OK" button L4 is turned on, the processing at step S546 and the later is performed; if the OK button L4 is not turned on, determination is made on whether or not the user turns on the order button L5 (step S5278). If the order button L4 is turned on, the processing at step S518 and the later is performed. At this time, the top page P1 in FIG. 20 may be acquired and displayed, however, only the ink cartridge having an ink remaining amount equal to or less than the threshold value (here, black ink cartridge) may be displayed as in FIG. 23. On the other hand, if the order button L5 is not turned on at step S528, determination is made on whether or not the user turns on the "HOW TO" button L10 (step S530). If the "HOW TO" button L10 is not turned on, process returns to step S526; if the how to button L10 is turned on, an ink purchase dialog including a delivery purchase button L11, a store purchase button L12, a utility start button L13, and a "CLOSE" button L14 is displayed on the display section 161 (step S532, see FIG. 24).

Determination is made on whether or not the user turns on the "CLOSE" button L14 (step S534). If the "CLOSE" button L14 is turned on, the processing at step S546 and the later is performed; if the close button L14 is not turned on, determination is made on whether or not the user turns on the utility start button L13 (step S536). If the utility start button L13 is turned on, a guidance processing routine for disclosing an ink cartridge replacement procedure is executed (step S545, not discussed in detail) and then the processing at step S546 and the later is performed. On the other hand,. if the utility start button L13 is not turned on, determination is made on whether or not the user turns on the delivery purchase button L11 or the store purchase button L12 (step S538). If neither button is turned on, determination is made on whether the delivery purchase button L11 or the store purchase button L12 is turned on. If the neither button, process is returned to step 534. If the delivery purchase button L11 or the store purchase button L12 is turned on, the print apparatus 100 is connected to the Internet (step S540), is connected to the Web server 620, acquires the Web page corresponding to the turned-on button (delivery purchase button L11 or store purchase button L12), displays the Web page on the display section 161, and transmits and receives data to and from the Web server 620 (step S542), then is disconnected from the Internet (step S544) and process is returned to step S534. At step S542, processing similar to that at step S608 described above may be executed.

According to the embodiment described above in detail, the status screen indicating the consumption degree of an ink cartridge, a consumable of the print apparatus 100 is displayed on the display section 161, and the order button L5 and the "HOW TO" button L10 as option calling buttons for calling the "DELIVERY PURCHASE" button and the "STORE PURCHASE" button as options for the purchase mode of the ink cartridge are displayed on the status screen, so that the user can turn on the button L5 or L10 displayed on the status screen for displaying the "DELIVERY PURCHASE" buttons and the "STORE PURCHASE button" on the display section 161 and then can select the purchase mode meeting his or her will from among them for purchasing the ink cartridge. Particularly, the user can comparatively consider the merits and demerits of delivery purchase and store purchase and select the purchase mode meeting his or her will in response to the circumstances.

The user may check the consumption degree with the black ink remaining amount meter L2 representing the ink cartridge and the ink remaining amount state and the color ink remaining amount meter L3 displaying the remaining amount of each color ink as a meter on the status screen before determining whether or not he or she purchases the ink cartridge; this point is convenient for the user.

Further, when it becomes necessary to replace the ink cartridge with a new one, automatically the "DELIVERY PURCHASE" buttons and the "STORE PURCHASE" button are displayed by the auto-start processing routine (see FIG. 18); this point is convenient for the user. Once the auto-start processing routine is executed, auto-start can be inhibited until ink cartridge replacement by user's will; this point is also convenient for the user.

Further, if the user selects the "DELIVERY PURCHASE" button, the ordering screen (page P2 in FIG. 20) for ordering the ink cartridge is acquired from the web server 620 and is displayed on the display section 161, so that the user can purchase the ink cartridge as online shopping by performing easy operation. When the user selects the "DELIVERY PURCHASE" button, he or she enters zip code of his or her place retrieval key information, whereby the tax corresponding to the region of the zip code is displayed. Thus, the user can easily know the amount of tax changing depending on the place where the user resides. On the other hand, if the user selects the "STORE PURCHASE" button, the dealer information providing screen (page P4 in FIG. 20) is acquired from the Web server 620 and is displayed on the display section 161, so that the user can easily get the dealer information and thus can use the dealer information as a guideline for determining which dealer the consumable is to be purchased at. When the user selects the "STORE PURCHASE" button, he or she enters the country name and zip code of his or her place retrieval key information, whereby the user can get the dealer information indicating the same dealer place as or the dealer place near to the place where the user resides.

Third Embodiment

Figure 25:
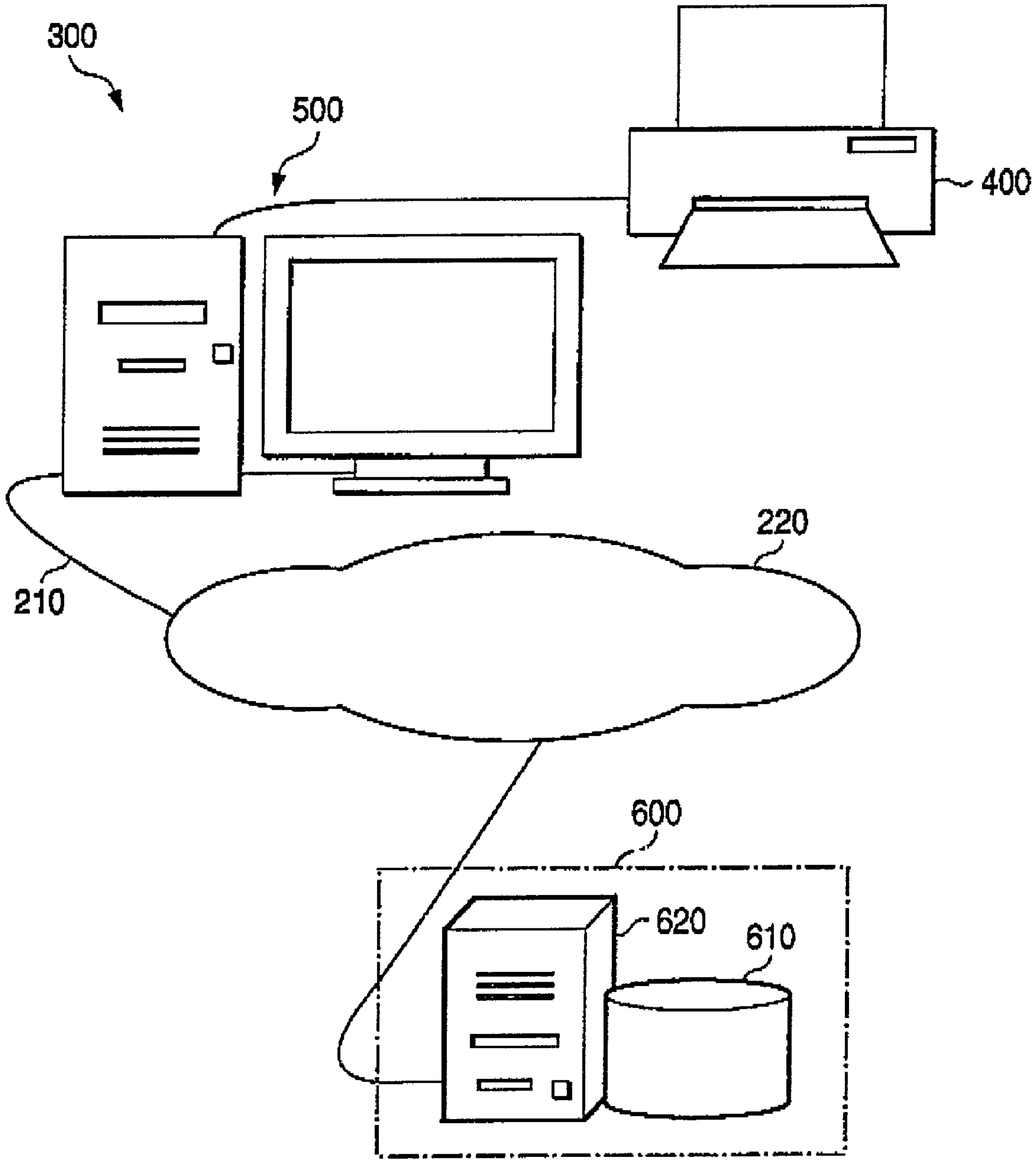
FIG. 25 is a drawing to describe a schematic configuration of a print apparatus in a third embodiment of the invention.
Figure 26:
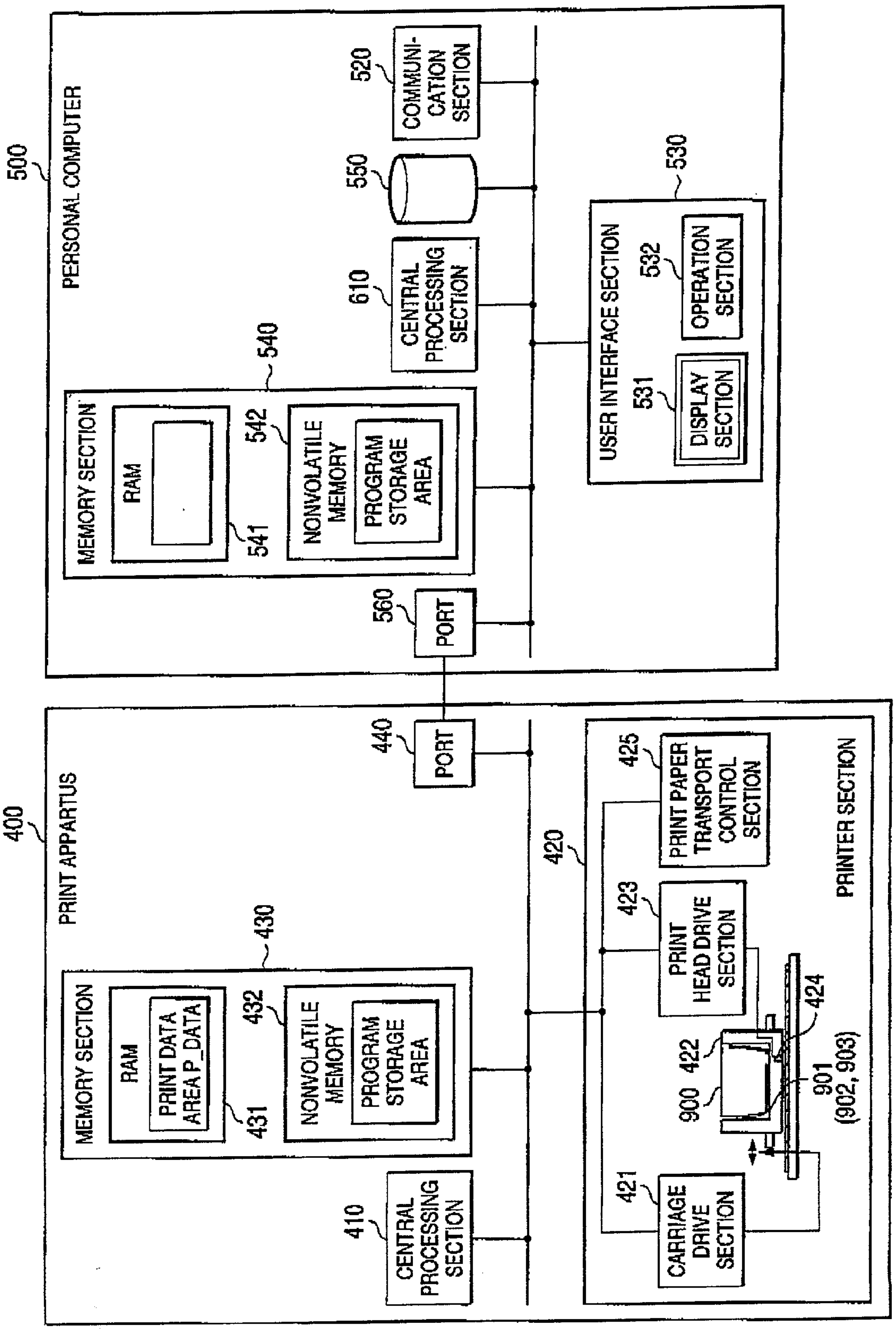
FIG. 26 is a detailed functional block diagram of the print apparatus in the third embodiment of the invention.

FIG. 25 is a drawing to show a schematic configuration of a print apparatus consumable purchase system of a third embodiment of the invention and FIG. 26 is a block diagram of the print apparatus consumable purchase system. The print apparatus consumable purchase system 300 in the third embodiment comprises a print apparatus 400 and a personal computer 500 to which the print apparatus 400 is connected, as shown in FIG. 25. In FIG. 25, the personal computer 500 has a network function and can be connected to a public line 210 and a network 220. A consumable dealer database site 600 is connected to the network 220. The consumable dealer database site 600 is shown as a Web server 620 comprising a storage unit 610 in FIG. 25, but substantially may be a so-called home page opened on the network.

The print apparatus 400 has a central processing section 410, a printer section 420 and a memory section 430. The central processing section 410 is an arithmetic unit containing a CPU and executes various programs recorded in the memory section 430. The printer section 420 contains a carriage drive section 421, a print head drive section 423 and a print paper transport control section 425. A print head 424 is mounted on a carriage 422. The carriage drive section 421 reciprocates the carriage along a platen not shown. The print head drive section 423 sends a drive signal to the print head 424 for printing an image corresponding to print data P_DATA stored in RAM 431 of the memory section 430 on print paper in cooperation with moving the carriage 422 by the carriage drive section-421 and transporting print paper by the print paper transport control section 425, An ink cartridge 900 is mounted on the carriage 422. The ink cartridge 900 comprises IC memory 901 and an ink remaining amount information area 902 and a type information area 903 are allocated in the IC memory 901. Ink remaining amount information REST detected by the central processing section 410 is written into the ink remaining amount information area 902. Type information (model) ST of the ink cartridge 900 detected by the central processing section 410 is written into the type information area 903. If a cartridge having no IC memory is mounted, the ink remaining amount information REST can be written into nonvolatile memory 432. The memory section 430 is made up of the RAM 431 having a print data (P_DATA) area and the nonvolatile memory 432 having a program storage area (containing an ink remaining amount detection program and a cartridge type detection program as well as a printer control program).

The personal computer 500 has a central processing section 510, a communication section 520, a user interface section 530, a memory section 540, a hard disk unit 550, and a port 560. The central processing section 510 is an arithmetic unit containing a CPU and executes various programs recorded in the memory section 540. The communication section 520 can issue a request for acquiring purchase source information about ink cartridge (BS_REQ) to the dealer database site 600 through the communication network 220 and can acquire the purchase source information BS from the dealer database site 600. The user interface section 530 comprises a display section 531 and an operation section 532. The display section 531 is a computer display. The operation section 532 normally is made up of a keyboard or soft buttons on the computer display. The memory section 540 comprises RAM 541 and nonvolatile memory 542 like that of a usual computer.

A purchase source information area 551 and a program storage area 552 are allocated to the hard disk unit 550. The purchase source information BS (containing dealer information DEAL and selling condition information TERM) is written into the purchase source information area 551. In addition to a printer driver, a cartridge ordering assist program, a cartridge replacement assist program, and a database site access program (containing a consumable information acquisition program) are stored in the program storage area 552.

The print apparatus 400 and the personal computer 500 communicate with each other through a port 440 and the port 560. For example, the print apparatus 400 can load print data P_DATA from the hard disk unit 550 of the personal computer 500 and store the print data in the print data area of the RAM 431 of the memory section 430 and on the other hand, can send the ink remaining amount information REST stored in the ink remaining amount information area 902 of the IC memory 901 to the personal computer 500.

The third embodiment may be operated like the first embodiment or may be operated like the second embodiment. That is, the central processing section 410 of the print apparatus 400 and the central processing section 510 of the personal computer 500 collaborate with each other for performing processing according to the flowcharts and displaying display screens similar to those in the first or second embodiment on the display section 531.

The invention is not limited to the described embodiments and various changes and modifications may be made in the invention without departing from the spirit and scope thereof, needless to say. For example, if an ink cartridge is kept in stock, it is made possible to register the fact in the print apparatus 100 and when the ink remaining amount becomes equal to or less than the threshold value, determination is made on whether or not an ink cartridge is kept in stock. If an ink cartridge is kept in stock, a message for prompting the user to replace the ink cartridge in the print apparatus 100 may be simply displayed on a screen.

What is claimed is:

1. A print apparatus consumable purchase system, comprising:

a print apparatus operable to perform a printing on a print medium;

a display capable of displaying information concerning the print apparatus; and a controller operable to display a status screen for representing a remaining amount of a consumable used with the print apparatus on the display, wherein when the remaining amount is not greater than a first threshold being greater than 0, the controller displays on the display a warning to replace the consumable, and when the remaining amount is not greater than a second threshold being greater than the first threshold, the controller displays on the display purchase information for purchasing the consumable.

2. The print apparatus consumable purchase system as claimed in claim 1, wherein:

the controller displays one of a plurality of options concerning a purchase mode of the consumable in the status screen or an option calling button for calling the plurality of options in the status screen, and the plurality of options includes a delivery purchase options represented by a corresponding delivery purchase button and an in-store purchase option represented by a corresponding in-store purchase and pick-up button for acquiring a screen for providing dealer information.

3. The print apparatus consumable purchase system as claimed in claim 2, wherein, when the option calling button is selected, the controller;

(a) displays the plurality of options on the display, (b when any option is selected from among the plurality of options, connects to a predetermined server through a network and causes a screen to be presented, said screen corresponding to the selected option from the server, and (c) then displays the screen on the display.

4. The print apparatus consumable purchase system as claimed in claim 1, wherein:

after displaying the warning, the controller interrupts the printing.

5. The print apparatus consumable purchase system as claimed in claim 1, wherein:

after displaying the warning, the controller displays information on a consumable replacement assist on the display.

6. The print apparatus consumable purchase system as claimed in claim 1, wherein:

the purchase information includes a delivery purchase information for making a request for delivery purchase of the consumable.

7. The print apparatus consumable purchase system as claimed in claim 1, wherein:

the purchase information includes in-store and pick-up purchase information for calling dealer information concerning a dealer dealing in the consumable.

8. The print apparatus consumable purchase system as claimed in claim 4, wherein:

when a request for replacing the consumable is not made, the controller restarts the printing.

9. The print apparatus consumable purchase system as claimed in claim 2, wherein, when the option calling button is selected, the controller;

(a) connects to a predetermined server through a network and causes a screen to be presented, said screen displaying the plurality of options from the server and (b) displays the screen on the display.

10. The print apparatus consumable purchase system as claimed in claim 2, wherein, when the delivery purchase button is selected, the controller;

(a) causes a screen to be presented, said screen containing a retrieval key information input field for entering user's place retrieval key information as as ordering screen for ordering the consumable from a predetermined server through a network, (b) displays the screen on the display, (c) then transmits the user's place retrieval key information entered in the retrieval key information input field to the server so as to receive place-dependent selling condition information extracted by the server based on the user's place retrieval key information, and (d) then displays the received place-dependent selling condition information on the display.

11. The print apparatus consumable purchase system as claimed in claim 2, wherein, when the delivery purchase button is selected, the controller;

(a) acquires an ordering screen for ordering the consumable from a predetermined server through a network and (b) then displays the screen on the display.

12. The print apparatus consumable purchase system as claimed in claim 11, wherein, when the delivery purchase button is selected, the controller:

(a) causes a screen to be presented, said screen containing one of a selling condition input field for entering selling condition information and a selling condition disclosure field for disclosing selling condition information as the ordering screen from a predetermined server through a network and (b) then displays the screen on the display.

13. The print apparatus consumable purchase system as claimed in claim 12, wherein at least one of in-stock and out-of-stock concerning the consumable and availability of empty vessel collection service is disclosed in the selling condition disclosure field.

14. The print apparatus consumable purchase system as claimed in claim 13, wherein, when the delivery purchase button is selected, the controller;

(a) causes a screen to be presented, said screen containing a retrieval key information input field for entering user's place retrieval key information as an ordering screen for ordering the consumable from a predetermined server through a network, (b) then displays the screen on the display, (c) then transmits the user's place retrieval key information entered in the retrieval key information input field to the server so as to receive place-dependent selling condition information extracted by the server based on the user's place retrieval key information, and (d) then displays the received place-dependent selling condition information on the display.

15. The print apparatus consumable purchase system as claimed in claim 10, wherein when the in-store purchase and pick-up button is selected, the controller;

(a) causes a screen to be presented, said screen containing a retrieval key information input field for entering user's place retrieval key information as a screen for providing the dealer information from a predetermined server through a network, (b) then displays the screen on the display, (c) then transmits the user's place retrieval key information entered in the retrieval key information input field to the server so as to receive place-dependent dealer information extracted by the server based on the user's place retrieval key information, and (c) then displays the received place-dependent dealer information on the display.

16. The print apparatus consumable purchase system as claimed in claim 14, wherein, when the in-store purchase and pick-up button is selected, the controller:

(a) causes a screen to be presented, said screen containing a retrieval key information input field for entering user's place retrieval key information as a screen for providing the dealer information from a predetermined server through a network, (b) then displays the screen on the display, (c) then transmits the user's place retrieval key information entered in the retrieval key information input field to the server so as to receive place-dependent dealer information extracted by the server based on the user's place retrieval key information, and (d) then displays the received place-dependent dealer information on the display.

17. The print apparatus consumable purchase system as claimed in claim 2, wherein, when the in-store purchase and pick-up button is selected, the controller causes a screen to be presented for providing the dealer information from a predetermined server through a network and displays the screen on the display.

18. The print apparatus consumable purchase system as claimed in claim 2, wherein the dealer information contains at least one of address information and map information for locating a dealer place.

19. The print apparatus consumable purchase system as claimed in claim 2, wherein, when the in-store purchase and pick-up button is selected, the controller:

(a) causes a screen to be presented, said screen containing a retrieval key information input field for entering user's place retrieval key information as a screen for providing the dealer information from a predetermined server through a network, (b) then displays the screen on the display, (c) then transmits the user's place retrieval key information entered in the retrieval key information input field to the server so as to receive place-dependent dealer information extracted by the server based on the user's place retrieval key information, and (c) then displays the received place-dependent dealer information on the display.

20. The print apparatus consumable purchase system of claim 2, wherein the in-store purchase and pick-up button is also configured for reserving the consumable for an in-store purchase from a selected dealer.

21. The print apparatus consumable purchase system as claimed in any one of claims 9, 3, 11, 12, 13, 10, 14, 17, 18, 19, 15, 16, and 2 wherein the consumable is a coloring material cartridge.

22. A computer readable storage medium storing a computer program configured to cause a computer to function as control means forming a part of a print apparatus consumable purchase system as claimed in any one of claims 9, 3, 11, 12, 13, 10, 14, 17, 18, 15, 16, 2.

23. The computer readable storage medium according to claim 22, wherein the consumable is a coloring material cartridge.

* * * * *

UNITED STATES PATENT AND TRADEMARK OFFICE

CERTIFICATE OF CORRECTION

PATENT NO. : 7,483,159 B2
APPLICATION NO. : 09/925737
DATED : January 27, 2009
INVENTOR(S) : Tokutomi et al.

It is certified that error appears in the above-identified patent and that said Letters Patent is hereby corrected as shown below:

Title page, Item (75), the Inventor information and Item (12) are incorrect.
should read:

-- (12) United States Patent
Tokutomi et al.

(75) Inventors: Fumio Tokutomi, Nagano (JP); Masumi Yoshino, Nagano (JP); Eiko Yanagida, Nagano (JP) --

Signed and Sealed this

Seventeenth Day of March, 2009

JOHN DOLL
*Acting Director of the United States Patent and Trademark Office*